United States Patent
Klippel et al.

(10) Patent No.: US 9,584,939 B2
(45) Date of Patent: Feb. 28, 2017

(54) ARRANGEMENT AND METHOD FOR MEASURING THE DIRECT SOUND RADIATED BY ACOUSTICAL SOURCES

(71) Applicant: Klippel GmbH, Dresden (DE)

(72) Inventors: Wolfgang Klippel, Dresden (DE); Daniel Knobloch, Dresden (DE)

(73) Assignee: Klippel GmbH, Dresden (DE)

( * ) Notice: Subject to any disclaimer, the term of this patent is extended or adjusted under 35 U.S.C. 154(b) by 227 days.

(21) Appl. No.: 14/152,556

(22) Filed: Jan. 10, 2014

(65) Prior Publication Data
US 2014/0198921 A1    Jul. 17, 2014

(30) Foreign Application Priority Data
Jan. 11, 2013   (DE) .......................... 10 2013 000 684

(51) Int. Cl.
*H04R 29/00*   (2006.01)
*H04R 3/00*   (2006.01)
(Continued)

(52) U.S. Cl.
CPC .......... *H04R 29/001* (2013.01); *G01H 3/125* (2013.01); *H04R 29/005* (2013.01); *G03H 3/00* (2013.01); *H04R 3/005* (2013.01)

(58) Field of Classification Search
CPC .... H04R 29/00; H04R 29/001; H04R 29/002; H04R 29/003; H04R 29/005; H04R 3/005; G01H 3/125; G03H 3/00
(Continued)

(56) References Cited

U.S. PATENT DOCUMENTS

| 6,738,479 | B1 | 5/2004 | Sibbald et al. |
| 2007/0036364 | A1 | 2/2007 | Okuno et al. |

(Continued)

FOREIGN PATENT DOCUMENTS

| CN | 101137250 A | 3/2008 |
| JP | 2007-47539 A | 2/2007 |

OTHER PUBLICATIONS

Bi, C.-X. et al., Acoustics 2012, "Recovery of the free field using the spherical wave superposition method", In Proceedings of Acoustics, Apr. 23-27, 2012, Nantes, Frankreich, S. 1781-1786, 6 pages.
(Continued)

*Primary Examiner* — Davetta W Goins
*Assistant Examiner* — Daniel Sellers
(74) *Attorney, Agent, or Firm* — Westman, Champlin & Koehler, P.A.

(57) ABSTRACT

The invention provides an arrangement and a method for measuring the direct sound $w_{rad}$ radiated by an acoustical source under test (e.g. loudspeakers) under the influence of acoustic ambient noise sources $Q_1$ and reflections at acoustical boundaries (e.g. room walls). An acquisition device measures a state variable $p_t(r_m)$ of the sound field at a plurality of measurement points $r_m$ in a scanning range $G_m$ by a sensor and generates a scanned data set $p_{G_m,t}^{Q_0,Q_1}$. Based on this data set an analyzer determines the coefficients $C_{rad}^{Q_0}$ associated with expansion functions which are solutions of the wave equation. An identifier uses the scanned data set $p_{G_m,t}^{Q_0,Q_1}$ for generating parameter information P for the analyzer which are the basis for separating the direct sound $w_{rad}$ from room reflections $w_{ref}$ and other waves $w_{sec}$ scattered at the surface of the source under test. An extrapolator predicts the state variable $p_{rad}^{Q_0}$ of the direct sound $w_{rad}$ at any point outside the scanning range $G_m$ by using the coefficients $C_{rad}^{Q_0}$ of the wave expansion.

30 Claims, 9 Drawing Sheets

(51) Int. Cl.
*G01H 3/12* (2006.01)
*G03H 3/00* (2006.01)

(58) Field of Classification Search
USPC ..................................... 381/58, 59
See application file for complete search history.

(56) References Cited

U.S. PATENT DOCUMENTS

| | | | | |
|---|---|---|---|---|
| 2008/0232192 A1* | 9/2008 | Williams | ............... | G01H 5/00 367/8 |
| 2008/0260167 A1 | 10/2008 | Kim et al. | | |
| 2010/0316231 A1* | 12/2010 | Williams | ............... | H04R 3/005 381/92 |
| 2011/0075860 A1* | 3/2011 | Nakagawa | ............... | G01H 3/00 381/94.1 |
| 2011/0164466 A1* | 7/2011 | Hald | ............... | G01H 3/125 367/8 |

OTHER PUBLICATIONS

Melon, Manuel et al., "Comparison of Four Subwoofer Measurement Techniques", CNAM Laboratoire d'Acoustique, Paris, France, J. Audio Eng. Soc., vol. 55, No. 12, Dec. 2007, 15 pages.
Weinreich, Gabriel et al., "Method for measuring acoustic radiation fields", Randall Laboratory of Physics, University of Michigan, Ann Arbor, J. Acoust. Soc. Am. 68(2), Aug. 1980, 8 pages.
Office Action, including Search Report, for Chinese Patent Application No. 201410079512.1, dated Sep. 5, 2016, 5 pages.

\* cited by examiner

US 9,584,939 B2

ARRANGEMENT AND METHOD FOR MEASURING THE DIRECT SOUND RADIATED BY ACOUSTICAL SOURCES

CROSS-REFERENCE TO RELATED APPLICATION

This Application is a non-provisional Application of German Application No. DE 10 2013 000 684.8, filed Jan. 11, 2013, in German, the contents of which are hereby incorporated by reference in their entirety.

FIELD OF THE INVENTION

This invention relates to an arrangement and a method for determining the direct sound radiated by an acoustical source under test (e.g. loudspeakers) under the influence of acoustic ambient noise sources and reflections at acoustical boundaries (e.g. room walls).

Thus the assessment of the direct sound is requires free field condition which can be realized in anechoic rooms. The measurement of far field response of large loudspeaker systems as used in professional applications (e.g. line arrays) require large anechoic rooms with special treatment of the walls to ensure sufficient absorption of the sound at low frequencies. There is a need to perform accurate measurements in a non-anechoic environment.

BACKGROUND OF THE INVENTION

The present invention and its underlying problem will hereinafter be described on the basis of recent research activities of multiple authors, however, without restricting the invention to this sort of application.

M. Melon, et. al. investigated alternative methods in the paper "Comparison of four subwoofer measurement techniques," J. Audio Eng. Soc. 55 (12), 1077-1091 (2007). At high frequencies the direct sound $w_{rad}$ generated by a source under test $Q_0$ can be separated by windowing the impulse response from a later arriving room reflections $w_{ref}$. This technique is not applicable at low frequencies where the corresponding wave length is not small compared with the minimum distance between source $Q_0$ and surrounding boundary surfaces.

G. Weinreich and E. Arnold suggested in the paper "Method for measuring acoustic radiation fields," published in the J. Acoustical Soc. Am. 68(2), 404-411 (1980), a holographic Input Output Field Separation Method (IOFS) for measuring the direct sound of the source under test $Q_0$ based on an expansion of the sound pressure measured at two concentric spheres.

Melon applied this IOFS-method to loudspeakers in the paper "Measurement of subwoofers with the field separation method: comparison of p-p and p-v formulations," published in proceedings of the Acoustics 2012 Conference, 23-27 Apr. 2012, Nantes, France. The sound $p_{S,scat}^{Q_0+Q_1}$ reflected and scattered at the surface $S_0$ of the source under test $Q_0$ causes an error in the measurement if the surface $S_0$ is not small compared to size of the scanning surface $S_1$.

To overcome this problem C.-X. Bi suggested in the paper "Recovery of the free field using the spherical wave superposition method", published in Proceedings of the Acoustics 2012 Conference, 23-27 Apr. 2012, Nantes, France, a holographic Primary Source Field Separation Method (PSFS) using the acoustical impedance $Y_{S_0}$ and the shape of the surface $S_0$ as additional input information. Due to the complexity of the shape and variety of materials used in loudspeaker design those information are not easily available and the method is usually not applicable in practice.

C. Langrenne, suggested in his thesis "Methodes de regularisation du probleme inverse acoustique pour l'indentification de sources en milieu confine et pertube, Universite du Maine, 1997, a perturbation method for separating direct sound from the wave reflected and scattered at surface $S_0$. This method requires additional measurements of the sound pressure $p_t(r_m)$ at multiple measurement points $r_m$ with m=1, ... M while deactivating the source under test $Q_0$ and activating a perturbation source $Q_2(r_e)$ at multiple positions $r_e$ with e=1, ... , E in the space between outer scanning surface $S_2$ and the room boundary $S_B$. The perturbation technique is very time consuming because the determination of the transfer matrix H requires a large number of measurements (product of E and M).

The known field separation methods using spherical harmonics are limited to frequencies below a cut-off frequency $f_G \approx 55$ N/$r_1$, where the maximal order N of the expansion is high enough to approximate the field enclosed by a spherical scanning surface $S_1$ with the radius $r_1$.

Melon scans the sound pressure on a spherical surface in the half space by placing the source under test on an acoustically hard floor. The center of the scanning surface corresponds with the origin of the spherical coordinate system and is used as the expansion point $r_0$ in the wave expansion based on spherical harmonics. Thus the expansion point $r_0$ is not identical with the acoustical center of the source under test. The holographic measurements of loudspeaker systems using multiple transducers mounted in a large enclosure require a high order N of the wave expansion associated with a large number of measurement points to describe the sound pressure in the near field of the source at sufficient accuracy.

There is a need to find a simpler/more reliable possibility to measure the direct sound of a source under test $Q_0$ under the influence of room reflection and ambient noise which overcomes the disadvantages of the known methods.

SUMMARY OF THE INVENTION

The present invention provides an arrangement and a method for measuring the sound pressure $p_t(r_m)$, sound intensity or any other state variable of the sound field surrounding the source under test $Q_0$ at multiple measurement points $r_m$ defined by a scanning vector R=[$r_1, r_2, \ldots r_m, \ldots r_M$] in a scanning range $G_m$ around the source under test $Q_0$. The inner boundary surface $S_{in}$ of the scanning range $G_m$ may have a spherical, cylindrical or any other appropriate shape to surround the source under test closely without cutting its surface $S_0$. There should be a minimum air volume between the surfaces $S_{in}$ and $S_0$ to assess the near field of source under test $Q_0$ and to achieve a maximal cut-off frequency $f_G$, where an IOFS-Method is applicable. A further advantage of a near field measurement is that the direct sound $w_{rad}$ has a higher amplitude than the room reflections $w_{ref}$ and ambient noise generated by an external source $Q_1$ between the acoustical boundaries $S_B$ and the outer surface $S_{out}$ of the scanning range $G_m$.

The measured state variables are summarized in a scanned data set $p_{G_m,t}^{Q_0,Q_1}$ and are described by a wave expansion of outgoing sound $w_{out}$ and incoming sound $w_{in}$ $$p_{G_m,t}^{Q_0,Q_1} = p_{G_m,out}^{Q_0,Q_1} + p_{G_m,in}^{Q_0,Q_1} = [\Psi_{G_m,out} \quad \Psi_{G_m,in}] \begin{bmatrix} C_{out}^{Q_0,Q_1} \\ C_{in}^{Q_0,Q_1} \end{bmatrix} \quad (1)$$

using the coefficients $$\begin{bmatrix} C_{out}^{Q_0,Q_1} \\ C_{in}^{Q_0,Q_1} \end{bmatrix} = [\Psi_{G_m,out} \quad \Psi_{G_m,in}]^{-1} p_{G_m}^{Q_0,Q_1} \quad (2)$$

and expansion functions $\Psi_{G_m,out}$ and $\Psi_{G_m,in}$.

The invention discloses a new PSFS-Method for separating the direct sound $w_{rad}$ from the secondary sound $w_{sec}$ scattered at the surface $S_0$. The PSFS-Method uses information provided by the acoustical scanning process. This method does not determine the velocity $v_{S_0,in}$ on the surface $S_0$ dispensing from acoustic impedance $Y_{S_0}$ and the geometry of $S_0$. According to the invention a transfer function $f$ is measured which describes the relationship $$C_{sec} = f(C_{in}) \quad (3)$$

between the wave coefficients $C_{in}$ of the incoming sound $w_{in}$ and wave coefficients $C_{sec}$ of the secondary sound $w_{sec}$.
The parameters P of the transfer function $f$ are derived from the scanned data set $p_{G_m,t}^{Q_0,Q_1}$ by exploiting the late part of the impulse response $h_t^{Q_0,Q_1}(r_m,t)$ when the direct sound is decayed and only room reflections, standing waves and other reverberant sound components remain. The sound pressure of the reverberant sound part at any measurement point $r_m$ $$p_{r,w}^{Q_0,Q_1}(r_m,t) = h_{S,w}^{Q_0,Q_1}(r_m,t) * u(t) \quad (4)$$

can be determined by a linear filter performing a convolution of the stimulus $u(t)$ with the windowed impulse response $$h_w^{Q_0,Q_1}(r_m,t) = W(t) h_t^{Q_0,Q_1}(r_m,t) \quad (5)$$
$$= W(t) FT^{-1} \left\{ \frac{p_t^{Q_0,Q_1}(r_m,\omega)}{U(\omega)} \right\}.$$

A second IO-Field Separation Method is used to determine the wave coefficients $$\begin{bmatrix} C_{out,w}^{Q_0,Q_1} \\ C_{in,w}^{Q_0,Q_1} \end{bmatrix} = [\Psi_{G_m,out} \quad \Psi_{G_m,in}]^{-1} p_{G_m,w}^{Q_0,Q_1} \quad (6)$$

of the incoming and outgoing reverberant sound using the expansion function. Those wave coefficients are the basis for identifying wave coefficients of the secondary sound $$C_{sec}^{Q_0,Q_1} = f(C_{in}^{Q_0,Q_1}, C_{in,w}^{Q_0,Q_1}, C_{out,w}^{Q_0,Q_1}) = k_x C_{out,w}^{Q_0,Q_1} \quad (7)$$

with a transmission parameter $$k_x = \frac{\langle C_{in}^{Q_0,Q_1}, C_{in,w}^{Q_0,Q_1} \rangle}{\langle C_{in,w}^{Q_0,Q_1}, C_{in,w}^{Q_0,Q_1} \rangle}. \quad (8)$$

Alternatively the secondary wave coefficients $$C_{sec}^{Q_0,Q_1} = f(C_{in}^{Q_0,Q_1}, C_{in,w}^{Q_0,Q_1}, C_{out,w}^{Q_0,Q_1}) = k_x (C_{out,w}^{Q_0,Q_1} - k_t C_{in,w}^{Q_0,Q_1}) + k_t C_{in}^{Q_0,Q_1} \quad (9)$$

can be determined by using a transparency factor $$k_t = 1 - \frac{\|C_{out,w}^{Q_0,Q_1} - C_{in,w}^{Q_0,Q_1}\|}{\|C_{in,w}^{Q_0,Q_1}\| + \|C_{out,w}^{Q_0,Q_1}\|}. \quad (10)$$

Both the transmission parameter $k_x$ and transparency factor $k_t$ depend on the particular position and orientation of the sound source under test $Q_0$ with respect to the boundary surface $S_B$ contrary to the perturbation method where the transfer matrix H is independent of the boundary surface $S_B$.

The wave coefficients of the direct sound $w_{rad}$ radiated by the source under test $Q_0$ $$C_{rad}^{Q_0} \approx C_{ps}^{Q_0} = C_{out}^{Q_0,Q_1} f < f_G, \quad (11)$$

can be determined by using the result of the IOFS-method and the new PSFS-method.

It is a further feature of the invention that the operational reliability of the IOFS-method is monitored by an IOFS-error vector $$e_{io} = p_{G_m,t}^{Q_0,Q_1} - [\Psi_{G_m,out} \quad \Psi_{G_m,in}] \begin{bmatrix} C_{out}^{Q_0,Q_1} \\ C_{in}^{Q_0,Q_1} \end{bmatrix} \quad (12)$$

which describes the mismatch between the measured and expanded sound pressure at the measurement points $r_M$ in the scanning range $G_m$.

The validity of the new PSFS-method can be assessed by a correlation factor $$c_x = \frac{\langle C_{in}^{Q_0,Q_1}, C_{in,w}^{Q_0,Q_1} \rangle}{\sqrt{\langle C_{in}^{Q_0,Q_1}, C_{in}^{Q_0,Q_1} \rangle \langle C_{in,w}^{Q_0,Q_1}, C_{in,w}^{Q_0,Q_1} \rangle}} \quad (13)$$
$$= \frac{\langle C_{in}^{Q_0,Q_1}, C_{in,w}^{Q_0,Q_1} \rangle}{\|C_{in}^{Q_0,Q_1}\| \|C_{in,w}^{Q_0,Q_1}\|},$$

between incoming sound and the reverberant component.

The wave coefficients $C_{rad}^{Q_0}$ determined by the field separation methods are less accurate if the norm $\|e_{io}\|$ of the IO-error vector exceeds a predefined threshold or there is a low correlation factor $c_x$. This occurs above the cut-off frequency $f_G$ depending on the maximal order N and the size of the scanning range $G_m$.

According to the invention the wave coefficients $C_{rad}^{Q_0}$ of the direct sound are determined at frequencies above a crossover frequency $f_c$ by an alternative method which generates a filtering data set $p_{G_m,w_{dir}}^{Q_0,Q_1}$ comprising the sound pressure $$p_{r,w_{dir}}^{Q_0,Q_1}(r_m,t) = \left( W_{dir} FT^{-1} \left\{ \frac{p_t^{Q_0,Q_1}(r_m,\omega)}{U(\omega)} \right\} \right) * u(t) \quad (14)$$

as the convolution of the stimulus $u(t)$ and the impulse response gated by time window $W_{dir}$. This gives the wave coefficients of the direct sound $$C_{rad}^{Q_0} = \begin{cases} C_{ps}^{Q_0} = C_{out}^{Q_0,Q_1} - C_{sec}^{Q_0,Q_1} & \text{for } f < f_c \\ C_w^{Q_0,Q_1} = \Psi_{G_m,out}^{-1} p_{G_m,w_{dir}}^{Q_0,Q_1} & \text{for } f \geq f_c \end{cases} \quad (15)$$

The validity of the alternative approach can be assessed by a windowed error vector $$e_w = p_{S_{out},t}^{Q_0,Q_1} - \Psi_{S_{out},out} C_w^{Q_0,Q_1} \quad (16)$$

which describes the deviation between the measured and expanded sound pressure on the outer surface $S_{out}$ of the scanning range $G_m$. The norm of the windowed error $\|e_w\|$ rises to lower frequencies when the window $W_{dir}$ cannot separate the direct sound $w_{rad}$ from the room reflections $w_{ref}$.

The optimal crossover frequency $f_c$ between the alternative methods can be determined by selecting one of the alternative methods which generates the lowest norm of the error vectors $\|e_w\|$ and $\|e_{io}\|$.

The wave coefficients of the associated expansion of the error coefficients $$E_{rad} = \begin{cases} \Psi_{G_m,out}^{-1} e_{io} & \text{for } f < f_c \\ \Psi_{S_{out},out}^{-1} e_w & \text{for } f \geq f_c \end{cases} \quad (17)$$

can be used to extrapolate the relative error $$e_{rad}(r) = \frac{|\Psi_{r,out} E_{rad}|}{|p_{rad}^{Q_0}(r)|} \quad (18)$$

and the validity of the predicted direct sound at any observation point r outside the scanning range $G_m$.

The field separation methods can only separate the primary sound $w_{rad}$ from the incoherent noise $w_{noise}$ generated by an ambient noise source $Q_1$ if the sound pressure $p_t(r_m)$ is measured at all points $r_m$ with m=1, ..., M at the same time by performing a synchronous multi-channel acquisition by using plurality of microphones with identical properties.

A cost effective alternative is a sequential scanning process using a single microphone because any linear distortion caused by the sensor's amplitude and phase response will not affect the holographic processing. Furthermore, the maximal number of measurement points and the order of the expansion associated with the angular resolution are only limited by the time of the scanning process and the numerical processing of the scanned data set $p_{G_m,w_{dir}}^{Q_0,Q_1}$.

A sequential scanning process requires a new technique for detecting invalid measurements corrupted by ambient noise $w_{noise}$ which is incoherent to the stimulus u(t). According to the invention a second microphone measures the sound pressure $p_t(r_a)$ at a larger distance from the source under test $Q_0$ than the first microphone measuring the sound pressure $p_t(r_m)$ in the scanning range $G_m$. The measured sound pressure $p_t(r_m)$ is invalid if the signal-to noise-ratio $$SNR = 20 \log\left(\frac{|p_t(r_m)|}{|p_t(r_a)|}\right) \quad (19)$$

is below a pre-defined threshold. The SNR can be improved by repeating the measurement at the same measurement point $r_m$ with identical stimulus u(t) and averaging the measured sound pressure $p_t(r_m)$. Sections of the sound pressure signal $p_t(r_m)$ which are corrupted by impulsive disturbances and have a extremely small SNR are excluded from averaging and only valid parts of multiple measurements may be merged to a valid response stored in said scanned data set $p_{G_m,w_{dir}}^{Q_0,Q_1}$.

Since the sequential scanning is very time consuming there is a need to require a minimum number M of measurement points $r_m$. However, the number M of measurement points $r_m$, with m=1, ..., M limits the order N of the expansion and the angular resolution of the measured directivity. For example an expansion based on spherical reference functions requires at least $M=2(N+1)^2$ measurement points to separate the incoming and outgoing sound field and to identify the wave coefficients of the direct sound associated with order N.

Contrary to the prior art the holographic measurement is realized as an adaptive technique which considers a mutual dependency between scanning and holographic analysis. A preliminary holographic analysis uses the first scanning data collected in $p_{G_m,w_{dir}}^{Q_0,Q_1}$ to identify the geometrical and acoustical properties of the sound source under test $Q_0$ and to adaptively determine the optimal placement of the remaining measurement points.

The inner and outer surfaces $S_{in}$ and $S_{out}$, respectively, of the scanning range $G_m$ are derived from the shape of the surface $S_0$ of the sound source under test $Q_0$. For example, a cylinder is a suitable scanning surface for slim multi-way loudspeaker.

The optimal value of the order $N(\omega)=n(\omega)$ of the expansion as a function of frequency $\omega$ is determined by searching for the order n in $\eta(\omega,n) \leq \eta_0 \leq \eta(\omega,n+1)$ where the relative contribution $$\eta(\omega, n) = \frac{\sum_{m=-n}^{n} c_{n,m,rad}(\omega)^2}{\sum_{j=0}^{N_{max}} \sum_{m=-j}^{j} c_{j,m,rad}(\omega)^2} \quad (20)$$

$$n = 1, \ldots, N_{max}(\omega)$$

of the coefficients $c_{n,m}$ to the total sound power is just below a predefined limit $\eta_0$.

The density and distribution of the measurement points $r_m$ in the scanning range $G_m$ and their distance $r_m$ from origin depends on the acoustical properties of the source under test $Q_0$. For example, a professional loudspeaker with high directivity requires more measurement points at the main direction of radiation than at the rear side of the loudspeaker. For those devices it is beneficial to divide the scanning range $G_m$ in a plurality of sub-ranges $G_1, G_2, \ldots$ having a different density of measurement points corresponding with the required angular resolution. The scanned data set comprising a lower density of measurement points are extended by interpolated points generated by a low-order wave field expansion. The measured and virtual data of all sub-ranges are combined and subject of a following high-order wave expansion, wherein the total number $(N+1)^2/2$ of coefficients may be larger than the total number of measurement points M.

The position of the expansion point $r_0(\omega)$ is crucial for a fast convergence of wave expansion generating an acceptable fitting error at the lowest order N. A good choice is the acoustical center of the sound source under test $Q_0$ which is a function of frequency $\omega$ in most loudspeaker systems using multiple transducers. The acoustical center can be detected by the group delay derived from the impulse response, the maximum sound pressure in the scanning range $G_m$, the minimum of the fitting error in the wave expansion or by interpreting the coefficients of the wave expansion. For example coefficients of zero and first order of the spherical wave expansion give a good estimate of the acoustical center corresponding with the optimal expansion point by using $$r_0(\omega) = \begin{bmatrix} x_e(\omega) \\ y_e(\omega) \\ z_e(\omega) \end{bmatrix} = \frac{\sqrt{3}}{k} \begin{bmatrix} \frac{1}{\sqrt{2}} \mathrm{Im}\left\{ \frac{C_{1,-1}(\omega) - C_{1,1}(\omega)}{C_{0,0}(\omega)} \right\} \\ \frac{1}{\sqrt{2}} \mathrm{Re}\left\{ \frac{C_{1,-1}(\omega) - C_{1,1}(\omega)}{C_{0,0}(\omega)} \right\} \\ \mathrm{Re}\left\{ \frac{C_{1,0}(\omega)}{C_{0,0}(\omega)} \right\} \end{bmatrix}. \quad (21)$$

The information about the acoustical center can also be used to optimize the shape of the scanning range $G_m$ and position of the measurement points in the scanning vector R[l+1] during the sequential scanning process.

According to the invention the number of measurement points can be further decreased by exploiting information A[l] about the axial and mirror symmetry of the directivity pattern and the orientation of the symmetry axis provided by the holographic analysis of the scanned data set. For example sound sources having approximately axially symmetrical directivity can be modeled by a subset of spherical expansion function and coefficients $C_{n,0,d}$ with $n=0, 1, \ldots, N$, which can be identified by significantly smaller number M of measurement points, where M>N. The symmetry information A[l] can already be derived from the first measurement data acquired during the sequential scanning process and used for optimizing the scanning process and holographic analysis.

If the source under test has no symmetry then the total number M of measurement points can be reduced by removing expansion functions and associated wave coefficients from the identification which provide a small contribution to the radiated sound power of direct sound $w_{rad}$. The contribution of each coefficient $C_{j,rad}$ among the other wave coefficients $C_{rad}^{Q_0}[l]$ can be assessed by the contribution ratio $$\gamma_j[l] = \frac{JC_{j,rad}[l]^2}{\frac{1}{J}\sum_{k=1}^{J} C_{k,rad}[l]^2} \quad (22)$$

$j = 1, \ldots, J.$

According to the invention the holographic analysis of the scanned data set $p_{G_m,t}^{Q_1,Q_2}$ is performed as an iterative process using a sparse set of expansion functions, wherein the coefficients $c_{j,rad}[l]$ having a low contribution ratio $\gamma_j[j]$ are replaced in each step l by coefficients of higher-order expansion functions which improve the accuracy and angular resolution of the expansion.

Specific embodiments of the invention are set forth in the dependent claims. These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale.

In all figures of the drawings elements, features and signals which are the same or at least have the same functionality have been provided with the same reference symbols, unless explicitly stated otherwise.

DETAILED DESCRIPTION OF EMBODIMENTS

Figure 1:
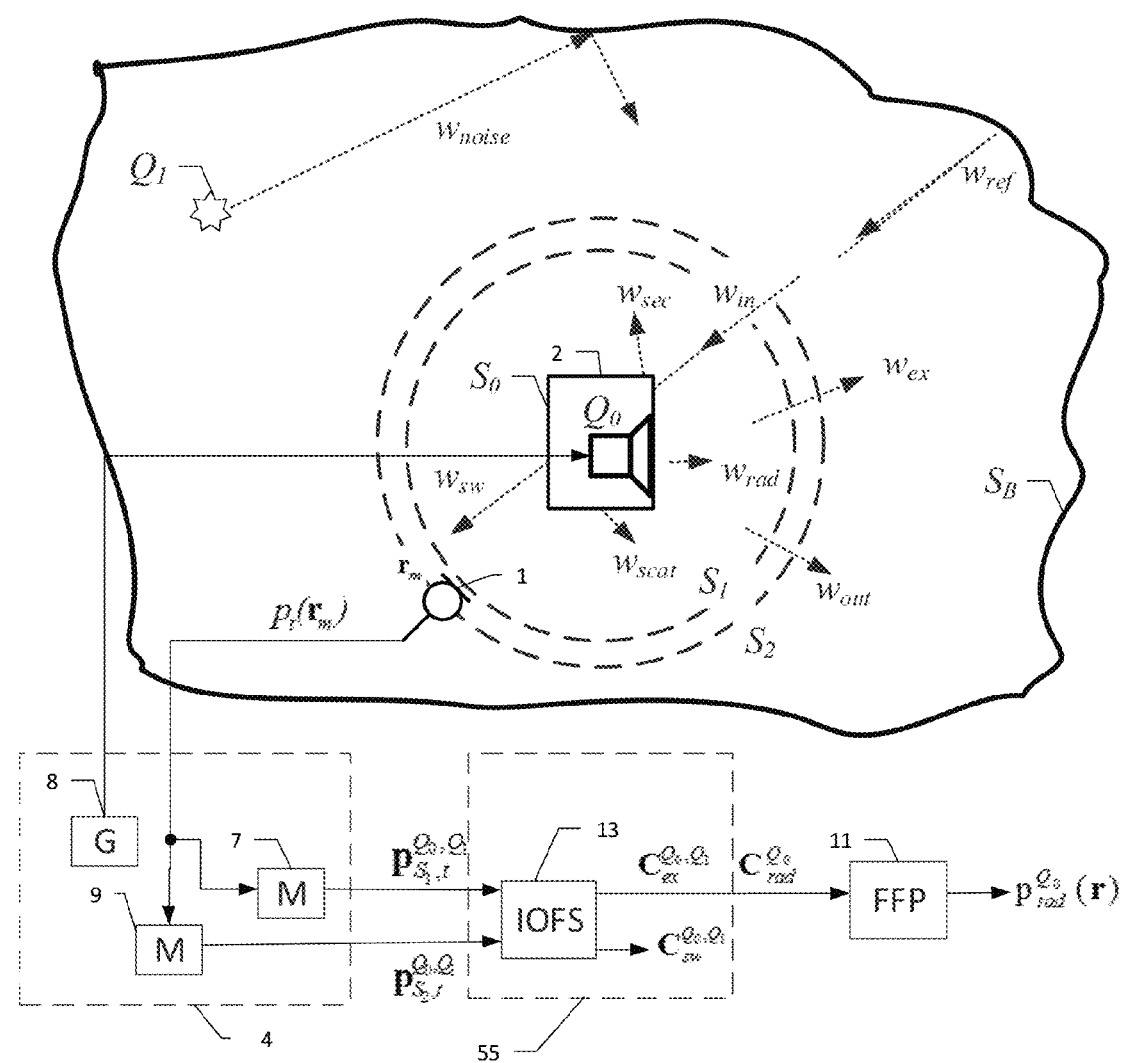
FIG. 1 schematically shows a holographic measurement of the direct sound using a IOFS-method.

FIG. 1 shows an IOFS-method for measuring the direct sound $p_{rad}^{Q_0}(r)$ at an observation point r radiated by the source $Q_0$ under test 2 excited by an excitation signal u(t) generated by the generator 8. An acquisition device 4 uses a sensor 1 to measure the sound pressure $p_t(r_m)$ or another acoustical state variable on two spherical scanning surfaces $S_1$ and $S_2$ close to the source under test 2 and collects the sound pressure signals in two scanned data sets $p_{S_1,t}^{Q_0,Q_1}$ and $p_{S_2,t}^{Q_0,Q_1}$ by using the storage devices 7 and 9, respectively.

Reverberant sound $w_{ref}$ generated by room reflections of the direct sound $w_{rad}$ at boundary $S_B$ and noise $w_{noise}$ generated by an external source $Q_1$ passes the scanning surfaces in an incoming wave $w_{in}$ and generates a secondary sound $w_{sec}$ by reflection, diffraction and scattering at the surface $S_0$ of the device under test 2. The superposition of the secondary sound $w_{sec}$ and the direct sound $w_{rad}$ gives the outgoing wave $w_{out}$ at both scanning surfaces.

The total sound pressure at point r in the sound field at frequency $\omega$ $$p_t(r, \omega) = p_t(r, \theta, \phi, \omega) \quad (23)$$

$$= p_{out}^{Q_0,Q_1}(r, \theta, \phi, \omega) + p_{in}^{Q_0,Q_1}(r, \theta, \phi, \omega)$$

$$\sum_{n=0}^{N} \sum_{m=-n}^{n} c_{n,m,out}(\omega) h_n^{(1)}(kr) Y_n^m(\theta, \phi) +$$

$$\sum_{n=0}^{N} \sum_{m=-n}^{n} c_{n,m,in}(\omega) h_n^{(2)}(kr) Y_n^m(\theta, \phi)$$

$$= \sum_{j=1}^{J} C_{j,out}^{Q_0,Q_1}(\omega) \psi_{j,out}(r, \theta, \phi, \omega) +$$

$$\sum_{j=1}^{J} C_{j,in}^{Q_0,Q_1}(\omega) \psi_{j,in}(r, \theta, \phi, \omega)$$

is expanded into sound pressure components $p_{out}^{Q_0,Q_1}$ and $p_{in}^{Q_0,Q_1}$, corresponding to outgoing wave $w_{out}$ and incoming wave $w_{in}$, respectively. Both components are expanded in a series comprising expansion function $\psi_{j,out}$ and $\psi_{j,in}$ weighted by coefficients $C_{j,out}$ and $C_{j,in}$.

The solutions of the wave equation in Cartesian, cylindrical or spherical coordinates are perfect candidates for expansion functions. For example, the expansion function describes the angular dependency by spherical harmonics $Y_n^m(\theta,\phi)$ and the radial dependency from the expansion point by the Hankel function of the first and second kind, $h_n^{(1)}(kr)$ and $h_n^{(2)}(kr)$ in spherical coordinates. The expansion point $r_0$ is in the origin of the coordinate system.

The sound pressure of the outgoing wave $w_{out}$ $$p_{out}^{Q_0,Q_1}(r,\omega) = p_{out}^{Q_0,Q_1}(r,\theta,\phi,\omega) \qquad (24)$$

$$= p_{rad}^{Q_0}(r,\theta,\phi,\omega) + p_{sec}^{Q_0,Q_1}(r,\theta,\phi,\omega)$$

$$= \sum_{n=0}^{N}\sum_{m=-n}^{n} c_{n,m,rad}(\omega)h_n^{(1)}(kr)Y_n^m(\theta,\phi) +$$

$$\sum_{n=0}^{N}\sum_{m=-n}^{n} c_{n,m,sec}(\omega)h_n^{(1)}(kr)Y_n^m(\theta,\phi)$$

$$= \sum_{j=1}^{J} C_{j,rad}^{Q_0}(\omega)\psi_{j,out}(r,\theta,\phi,\omega) +$$

$$\sum_{j=1}^{J} C_{j,sec}^{Q_0,Q_1}(\omega)\psi_{j,out}(r,\theta,\phi,\omega)$$

comprises a sound pressure $p_{rad}^{Q_0}$ of the direct sound wave and a sound pressure $p_{sec}^{Q_0,Q_1}$ of the secondary wave $w_{sec}$.

An alternative expansion describes the total sound pressure $$p_t(r,\omega) = p_t(r,\theta,\phi,\omega) \qquad (25)$$

$$= p_{sw}^{Q_0,Q_1}(r,\theta,\phi,\omega) + p_{ex}^{Q_0,Q_1}(r,\theta,\phi,\omega)$$

$$= \sum_{n=0}^{N}\sum_{m=-n}^{n} c_{n,m,sw}(\omega)(h_n^{(1)}(kr)+h_n^{(2)}(kr))Y_n^m(\theta,\phi) +$$

$$\sum_{n=0}^{N}\sum_{m=-n}^{n} c_{n,m,ex}(\omega)h_n^{(1)}(kr)Y_n^m(\theta,\phi)$$

$$\sum_{n=0}^{N_1}\sum_{m=-n}^{n} c_{n,m,sw}(\omega)2j_n(kr)Y_n^m(\theta,\phi) +$$

$$\sum_{n=0}^{N_2}\sum_{m=-n}^{n} c_{n,m,ex}(\omega)h_n^{(1)}(kr)Y_n^m(\theta,\phi)$$

$$= \sum_{j=1}^{J_1} C_{j,sw}^{Q_0,Q_1}(\omega)\psi_{j,sw}(r,\theta,\phi,\omega) +$$

$$\sum_{j=1}^{J_2} C_{j,ex}^{Q_0,Q_1}(\omega)\psi_{j,out}(r,\theta,\phi,\omega)$$

as a superposition of the standing wave $w_{sw}$ represented by coefficients $C_{j,sw}^{Q_0,Q_1}$ and excess wave $w_{ex}$ represented by coefficients $C_{j,ex}^{Q_0,Q_1}$.

The excess sound pressure $$p_{ex}^{Q_0,Q_1}(r,\omega) = p_{ex}^{Q_0,Q_1}(r,\theta,\phi,\omega) \qquad (26)$$

$$= p_{rad}^{Q_0}(r,\theta,\phi,\omega) + p_{scat}^{Q_0,Q_1}(r,\theta,\phi,\omega)$$

$$= \sum_{n=0}^{N}\sum_{m=-n}^{n} c_{n,m,rad}(\omega)h_n^{(1)}(kr)Y_n^m(\theta,\phi) +$$

$$\sum_{n=0}^{N}\sum_{m=-n}^{n} c_{n,m,scat}(\omega)h_n^{(1)}(kr)Y_n^m(\theta,\phi)$$

$$= \sum_{j=1}^{J} C_{j,rad}^{Q_0}(\omega)\psi_{j,out}(r,\theta,\phi,\omega) +$$

$$\sum_{j=1}^{J} C_{j,scat}^{Q_0,Q_1}(\omega)\psi_{j,out}(r,\theta,\phi,\omega)$$

comprises the direct sound $w_{rad}$ radiated by the source under test $Q_0$ and the sound $w_{scat}$ scattered and reflected on the surface $S_0$.

The total pressure $p_{S,t}^{Q_0,Q_1}$ at the measurement points $r_m$ with $m=1, \ldots, M$, on the scanning surface $S\epsilon\{S_1, S_2, \ldots\}$ can be summarized to a scanned data set $$p_{S,t}^{Q_0,Q_1} = p_{S,in}^{Q_0,Q_1} + p_{S,out}^{Q_0,Q_1} \qquad (27)$$

$$= \Psi_{S,in}C_{in}^{Q_0,Q_1} + \Psi_{S,out}C_{out}^{Q_0,Q_1}$$

$$= p_{S,in}^{Q_0,Q_1} + p_{S,rad}^{Q_0} + p_{S,sec}^{Q_0,Q_1}$$

$$= \Psi_{S,in}C_{in}^{Q_0,Q_1} + \Psi_{S,out}\left(C_{rad}^{Q_0} + C_{sec}^{Q_0,Q_1}\right)$$

$$= p_{S,sw}^{Q_0,Q_1} + p_{S,ex}^{Q_0,Q_1}$$

$$= (\Psi_{S,out} + \Psi_{S,in})C_{sw}^{Q_0,Q_1} + \Psi_{S,out}C_{ex}^{Q_0,Q_1}$$

$$= p_{S,sw}^{Q_0,Q_1} + p_{S,ex}^{Q_0,Q_1}$$

$$= \Psi_{S,sw}C_{sw}^{Q_0,Q_1} + \Psi_{S,out}C_{ex}^{Q_0,Q_1}$$

$$= p_{S,sw}^{Q_0,Q_1} + p_{S,rad}^{Q_0} + p_{S,scat}^{Q_0,Q_1}$$

$$= \Psi_{S,sw}C_{sw}^{Q_0,Q_1} + \Psi_{S,out}\left(C_{rad}^{Q_0} + C_{scat}^{Q_0,Q_1}\right)$$

where the expansion uses the sound pressure vector $$p_{S,d}^Q = [p_d(r_1,\omega) p_d(r_2,\omega) \ldots p_d(r_M,\omega)]^T \qquad (28)$$

the wave coefficients $$C_d^Q = [C_{1,d}(\omega) C_{2,d}(\omega) \ldots C_{J,d}(\omega)]^T \qquad (29)$$

and the expansion matrix $$\Psi_{S,d} = \begin{bmatrix} \psi_{1,d}(r_1,\omega) & \psi_{2,d}(r_1,\omega) & \ldots & \psi_{J,d}(r_1,\omega) \\ \psi_{1,d}(r_2,\omega) & \psi_{2,d}(r_2,\omega) & \ldots & \psi_{J,d}(r_2,\omega) \\ \vdots & \vdots & \ddots & \vdots \\ \psi_{1,d}(r_M,\omega) & \psi_{2,d}(r_M,\omega) & \ldots & \psi_{J,d}(r_M,\omega) \end{bmatrix} \qquad (30)$$

with the indices representing the sound components $$d \epsilon \{t, in, out, ex, scat, sw, sec, rad\} \qquad (31)$$

and the indices representing the sound sources $$Q \epsilon \{Q_0, Q_1, Q_2, \ldots\} \qquad (32)$$

The expansion in Eq. (27) corresponds to the following relationship between the wave coefficients:

$$C_{out}^{Q_0,Q_1} = C_{sec}^{Q_0,Q_1} = C_{rad}^{Q_0} = C_{sw}^{Q_0,Q_1} + C_{ex}^{Q_0,Q_1} = C_{sw}^{Q_0,Q_1} + C_{scat}^{Q_0,Q_1} + C_{rad}^{Q_0}$$ (33)

The wave coefficients $C_{out}^{Q_0,Q_1}$ and $C_{in}^{Q_0,Q_1}$ are determined in the IOFS-method 13 by $$\begin{bmatrix} C_{ex}^{Q_0,Q_1} \\ C_{sw}^{Q_0,Q_1} \end{bmatrix} = \begin{bmatrix} \Psi_{S_1,ex} & \Psi_{S_1,sw} \\ \Psi_{S_2,ex} & \Psi_{S_2,sw} \end{bmatrix}^{-1} \begin{bmatrix} p_{S_1,t}^{Q_0,Q_1} \\ p_{S_2,t}^{Q_0,Q_1} \end{bmatrix}$$ (34)

or by performing an integration over spherical scanning surfaces $S_1$ and $S_2$ described by E. Williams in Fourier Acoustics, Academic Press 1999, chapter 7.4.

An extrapolator 11 determines the sound pressure of the direct sound $$p_{rad}^{Q_0}(r, \omega) = p_{rad}^{Q_0}(r, \theta, \phi, \omega)$$ (35)
$$= \sum_{n=0}^{N} \sum_{m=-n}^{n} c_{n,m,rad}(\omega) h_n^{(1)}(kr) Y_n^m(\theta, \phi)$$

at any observation point r beyond the scanning surface by using the coefficients $C_{rad}^{Q_0} \approx C_{ex}^{Q_0,Q_1}$ of the excess sound in analyzer 55.

Figure 2:
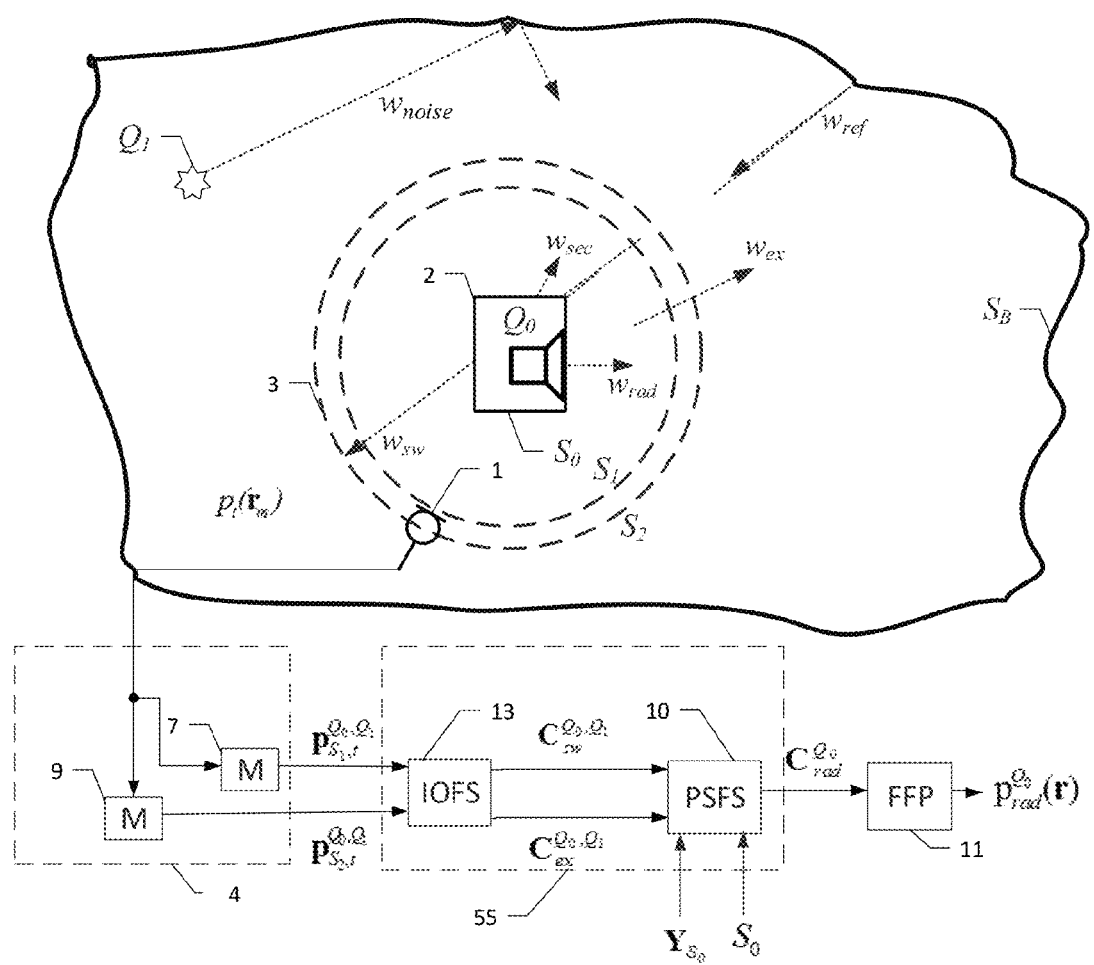
FIG. 2 shows a PSFS-method based on acoustical impedance of the surface to separate the scattered wave.

FIG. 2 shows a holographic measurement combining the IOFS-method and a PSFS-method. The coefficients $C_{ex}^{Q_0,Q_1}$ and $C_{sw}^{Q_0,Q_1}$ estimated by the IOFS-method 13 are supplied to the following PSFS-method 10 which generates the coefficients $C_{rad}^{Q_0}$ in the expansion of the direct sound pressure:

$$p_{S,rad}^{Q_0} = p_{S,t}^{Q_0,Q_1} - p_{S,sw}^{Q_0,Q_1} - p_{S,scat}^{Q_0,Q_1}$$ (36)
$$= p_{S,ex}^{Q_0,Q_1} - p_{S,scat}^{Q_0,Q_1}$$
$$= \Psi_{S,out}[C_{out}^{Q_0,Q_1} - C_{sw}^{Q_0,Q_1} - C_{scat}^{Q_0,Q_1}]$$
$$= \Psi_{S,out}[C_{ex}^{Q_0,Q_1} - C_{scat}^{Q_0,Q_1}]$$
$$= \Psi_{S,out} C_{rad}^{Q_0}$$

The coefficients associated with the scattered sound $w_{scat}$ are estimated by $$C_{scat}^{Q_0,Q_1} = (Y_{S_0} \Psi_{S_0,out} - \Psi_{S_0,out}^v)^{-1} (v_{S_0,sw} - Y_{S_0} p_{S_0,sw}^{Q_0,Q_1})$$ (37)

using the velocity on the surface $S_0$ of the source under test 2

$$v_{S_0,sw} = \Psi_{S_0,sw}^v C_{sw}^{Q_0,Q_1},$$ (38)

the expansion matrix of the standing wave $$\Psi_{S_0,sw}^v = \frac{1}{j\rho_0 c} \frac{d\Psi_{S_0,sw}}{dr},$$ (39)

the expansion matrix of the outgoing wave $$\Psi_{S_0,out}^v = \frac{1}{j\rho_0 c} \frac{d\Psi_{S_0,out}}{dr}$$ (40)

and acoustical admittance Y of the surface $S_0$.

Figure 3:
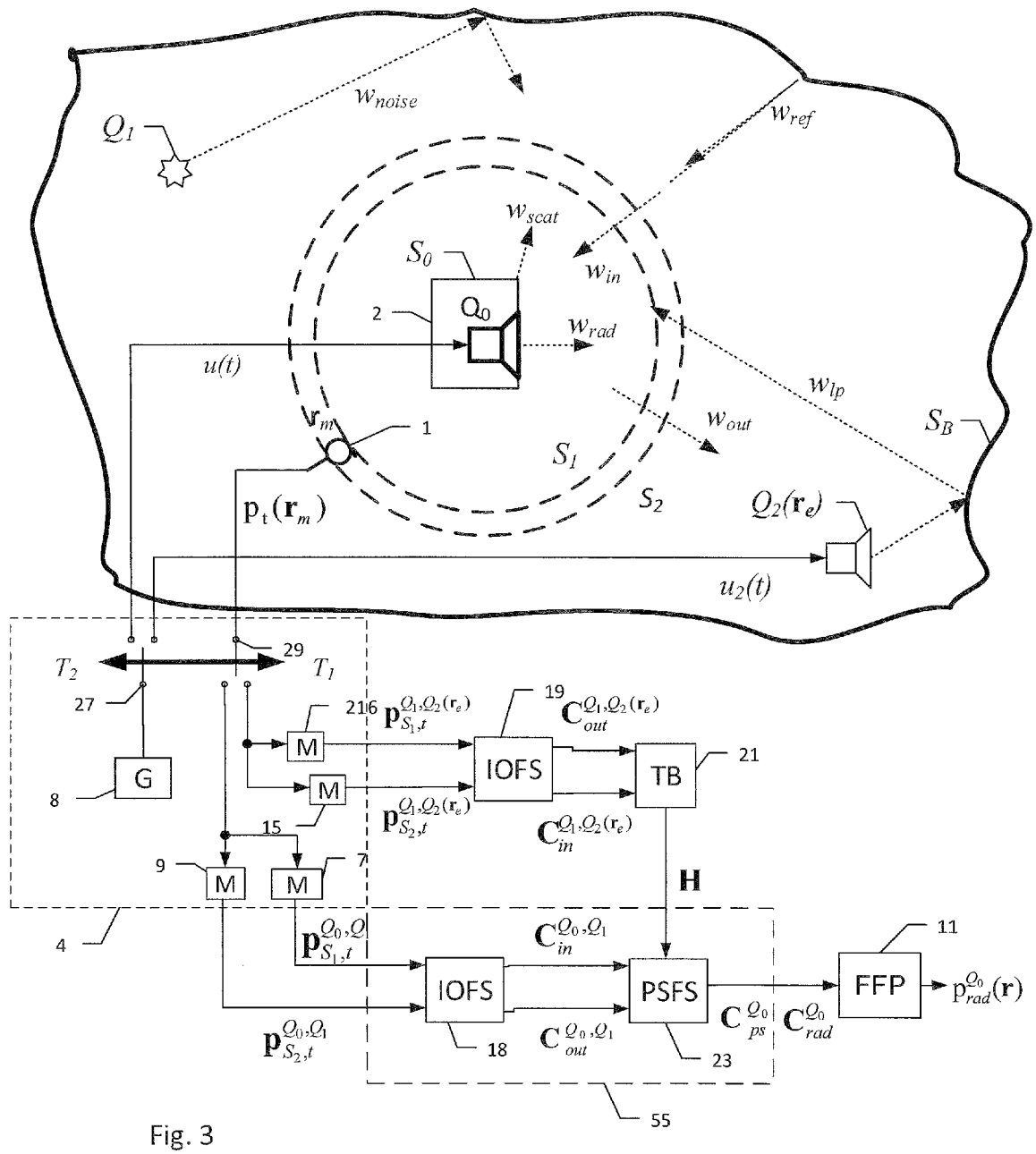
FIG. 3 shows a PSFS-method based on a perturbation by an external source $Q_2$.

FIG. 3 shows a perturbation method using an external sound source $Q_2$ placed at a plurality of points $r_e$ with $e=1, \ldots, E$ in the space between outer surface $S_{out}$ of the scanning range $G_m$ and the room boundary $S_B$. A switch 27 provides a stimulus generated by a generator 8, either to the source under test $Q_1$ or the external sound source $Q_2$. The switch 29 supplies the pressure signal $p_t(r_m)$ either to the storage devices 7 and 9 generating the scanned data set $p_{S,t}^{Q_0,Q_1}$ or to the storage devices 15 and 216 generating the scanned data set $p_{S,t}^{Q_1,Q_2(r_e)}$ depending on the position $r_e$.

The IOFS-module 19 provided with $p_{S,t}^{Q_1,Q_2(r_E)}$ generates the wave coefficients $$\begin{bmatrix} C_{out}^{Q_1,Q_2(r_e)} \\ C_{in}^{Q_1,Q_2(r_e)} \end{bmatrix} = \begin{bmatrix} \Psi_{S_1,out} & \Psi_{S_1,in} \\ \Psi_{S_2,out} & \Psi_{S_2,in} \end{bmatrix}^{-1} \begin{bmatrix} p_{S_1,t}^{Q_1,Q_2(r_e)} \\ p_{S_2,t}^{Q_1,Q_2(r_e)} \end{bmatrix}$$ (41)

$$e = 1, \ldots, E$$

which are supplied to subsystem 21 to identify the transfer matrix $$H = Z_{out} Z_{in}^{-1}$$ (42)

with $$Z_{out} \times [C_{1,out}^{Q_1,Q_2(r_1)} \ldots C_{j,out}^{Q_1,Q_2(r_e)} \ldots C_{J,out}^{Q_1,Q_2(r_E)}]$$ (43)

and $$Z_{in}[C_{j,in}^{Q_1,Q_2(r_1)} \ldots C_{j,in}^{Q_1,Q_2(r_e)} \ldots C_{j,in}^{Q_1,Q_2(r_E)}]$$ (44)

The IOFS-module 18 generates the wave coefficients $$\begin{bmatrix} C_{out}^{Q_0,Q_1} \\ C_{in}^{Q_0,Q_1} \end{bmatrix} = \begin{bmatrix} \Psi_{S_1,out} & \Psi_{S_1,in} \\ \Psi_{S_2,out} & \Psi_{S_2,in} \end{bmatrix}^{-1} \begin{bmatrix} p_{S_1,t}^{Q_0,Q_1} \\ p_{S_2,t}^{Q_0,Q_1} \end{bmatrix}$$ (45)

based on the scanned data sets $p_{S_1,t}^{Q_0,Q_1}$ and $p_{S_2,t}^{Q_0,Q_1}$ provided by the storage devices 7 and 9.

The following PSFS-module 23 generates the coefficients of the direct sound $$C_{rad}^{Q_0} = C_{out}^{Q_0,Q_1} - C_{sec}^{Q_0,Q_1} = C_{out}^{Q_0,Q_1} - H C_{in}^{Q_0,Q_1}$$ (46)

by using the results of the IOFS-method and the transfer matrix H.

Figure 4:
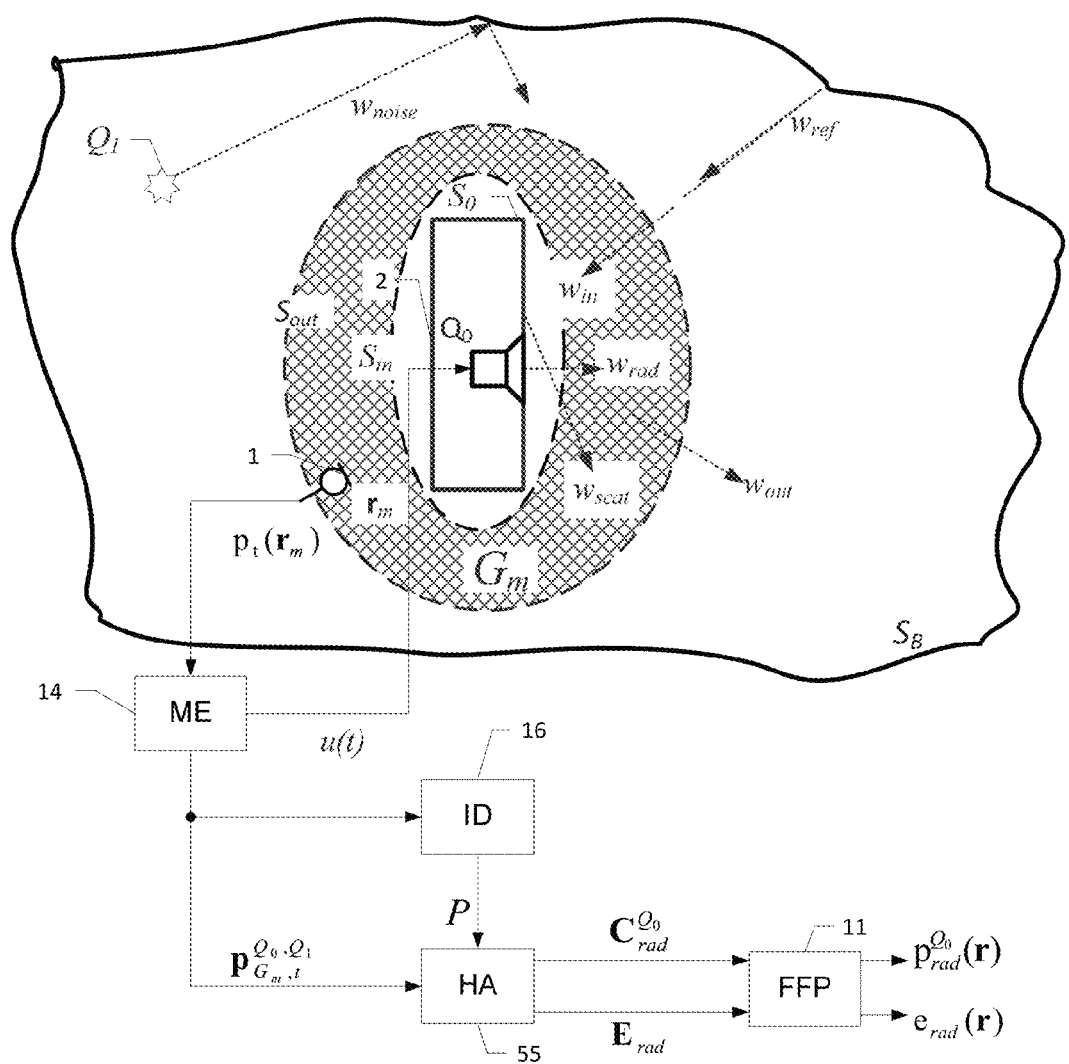
FIG. 4 schematically shows a holographic measurement based on a modified PSFS-method.

FIG. 4 shows schematically one embodiment of the holographic measurement method according to the present invention. The acquisition device 14 generates the stimulus u(t) exciting the device under test 2 with the source $Q_0$ and places the sensor 1 at the measurement points $r_m$ located in a scanning range $G_m$. Contrary to the prior art the scanning range $G_m$ depends on the shape of the surface $S_0$ of the device under test 2. An identifier 16 provided with the scanned data set $p_{G_m,t}^{Q_0,Q_1}$ generates a parameter P describing the acoustical properties of the device under test 2. Based on this parameter P and the scanned data set $p_{G_m,t}^{Q_0,Q_1}$ the analyzer 55 generates wave coefficients $C_{rad}^{Q_0}$ representing the direct sound $w_{rad}$ and error coefficients $E_{rad}$ representing the error of the direct sound prediction. Based on this information the extrapolator 11 generates the sound pressure $P_{rad}^{Q_0}(r)$ of the direct sound according to Eq. (35) and the relative error $e_{rad}(r)$ at observation point r according to Eq. (18).

Figure 5:
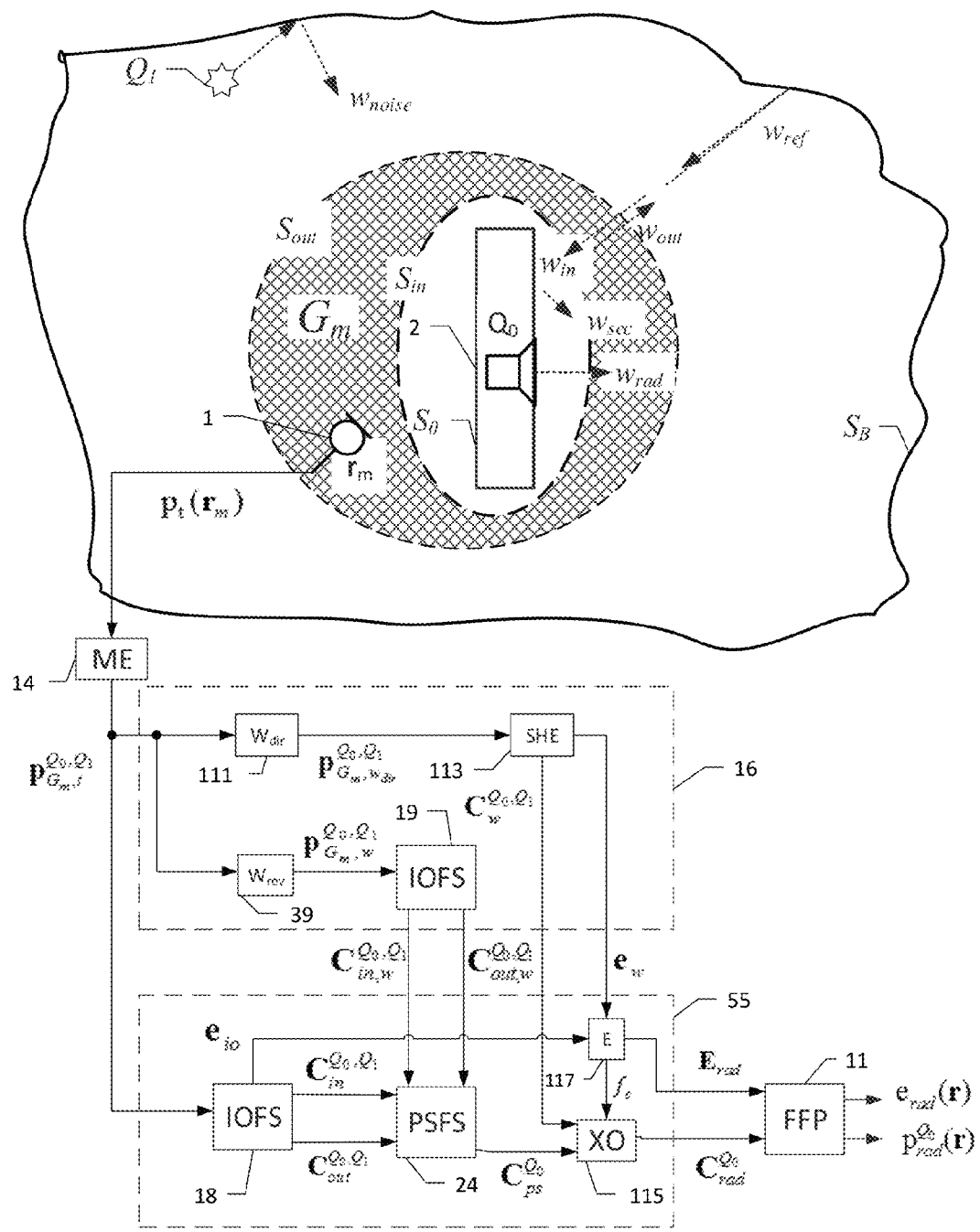
FIG. 5 shows an embodiment of the identifier generating the transfer parameter P based on the reverberant sound.

FIG. 5 shows an embodiment of the identifier 16 using scanned data set $p_{G_m,w}^{Q_0,Q_1}$ which is contrary to prior art the only input information. A linear filter 39 generates a filtered scanned data set $p_{G_m,w}^{Q_0,Q_1}$, according to Eq. (4). The following IOFS-module 19 generates the wave coefficients $C_{in,w}^{Q_0,Q_1}$ and $C_{out,w}^{Q_0,Q_1}$ according to Eq. (6) which represent the incoming and outgoing fields of the reverberant sound, respectively. The wave coefficients $C_{in,w}^{Q_0,Q_1}$ and $C_{out,w}^{Q_0,Q_1}$ are supplied as parameter P to PSFS-module 24 in the analyzer 55, which generates the wave coefficients $C_{ps}^{Q_0}$ of the primary sound according to Eqs. (7), (9), (11) using the wave coefficients $C_{in}^{Q_0,Q_1}$ and $C_{out}^{Q_0,Q_1}$ generated from the scanned data set $p_{G_m,t}^{Q_0,Q_1}$ by the IOFS-module 18.

Based on the scanned data set $p_{G_m,t}^{Q_0,Q_1}$ a linear filter 111 generates according to Eq. (14) a filtered scanned data set $p_{G_m,w_{dir}}^{Q_0,Q_1}$, which comprises components having a small group time delay. A free field expander 113 generates according to Eq. (15) the wave coefficients $C_w^{Q_0,Q_1}$ and error vector $e_w$ supplied as a parameter P to the analyzer 55. The analyzer 55 contains an evaluator 117 generating the crossover frequency $f_c$ and the error coefficients $E_{rad}$ according to Eq. (17) based on the error vector $e_w$ from the free field expander 113 and the error vector $e_{io}$ from the IOFS-module 18. A crossover 115 receives the crossover frequency $f_c$ and the wave coefficients $C_{ps}^{Q_0}$ and generates according to Eq. (15) the wave coefficients $C_{rad}^{Q_0}$.

Figure 6:
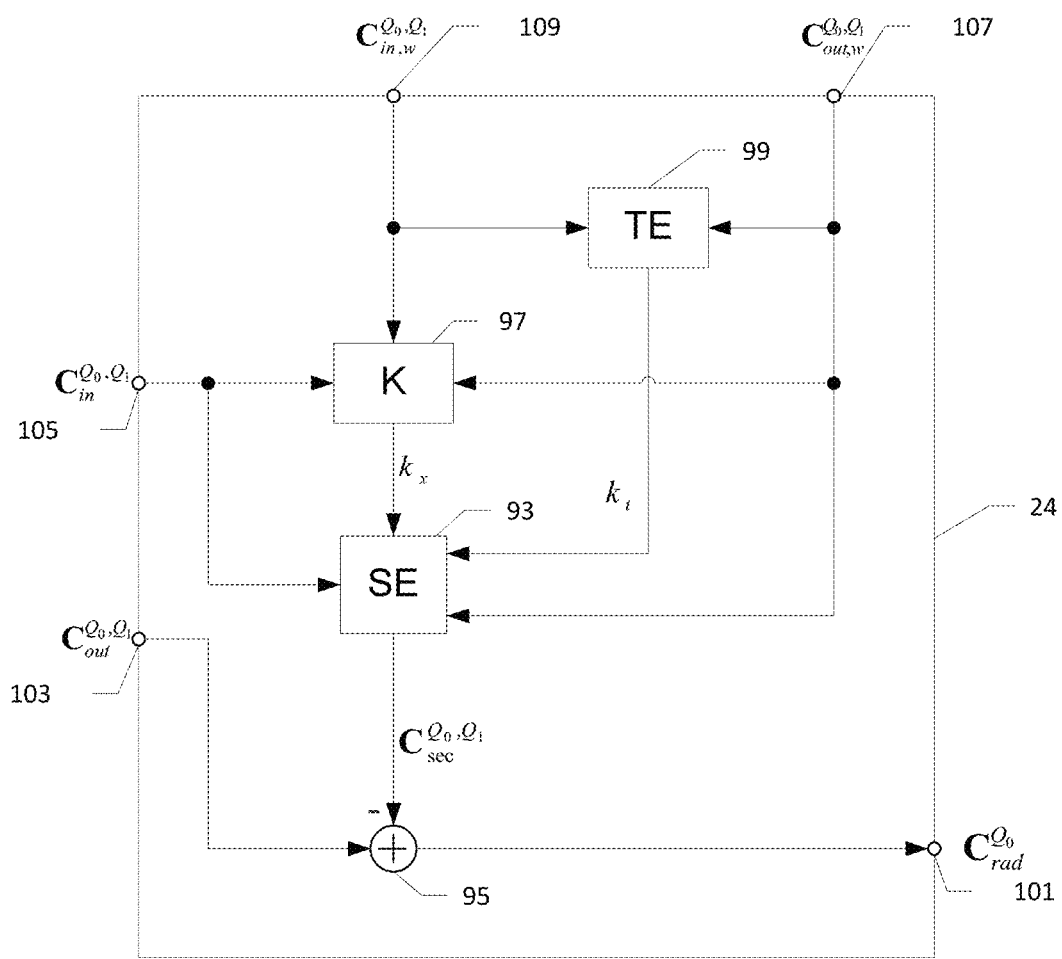
FIG. 6 shows an embodiment of the analyzer using the IOFS-method and the modified PSFS-method.

FIG. 6 shows an embodiment of the PSFS-module 24 in accordance with the invention. The correlator 97 generates the transmission parameter $k_x$ according to Eq. (8) based on the wave coefficients $C_{in,w}^{Q_0,Q_1}$ and $C_{in}^{Q_0,Q_1}$, wherein the transmission parameter $k_x$ describes the concurrence of the directivity of the total incoming sound $w_{in}$ and the directivity of the reverberant part of the incoming sound $w_{in}$.

The comparator 99 generates a transparency parameter $k_t$ according to Eq. (10) based on the wave coefficients $C_{in,w}^{Q_0,Q_1}$ and $C_{out,w}^{Q_0,Q_1}$, which describes the acoustical transparency of the space enclosed by the scanning range ($G_m$). A synthesizer 93 generates the secondary wave coefficients $C_{sec}^{Q_0,Q_1}$ associated with the expansion of the secondary sound $w_{sec}$ according to Eq. (9) based on the total incoming wave coefficients $C_{in}^{Q_0,Q_1}$, the transparency parameter $k_t$ and transmission parameter $k_x$. The combiner 95 generates the direct wave coefficients $C_{rad}^{Q_0}$ according to Eq. (15) based on total outgoing wave coefficients $C_{out}^{Q_0,Q_1}$ and the secondary wave coefficients $C_{sec}^{Q_0,Q_1}$.

Figure 7:
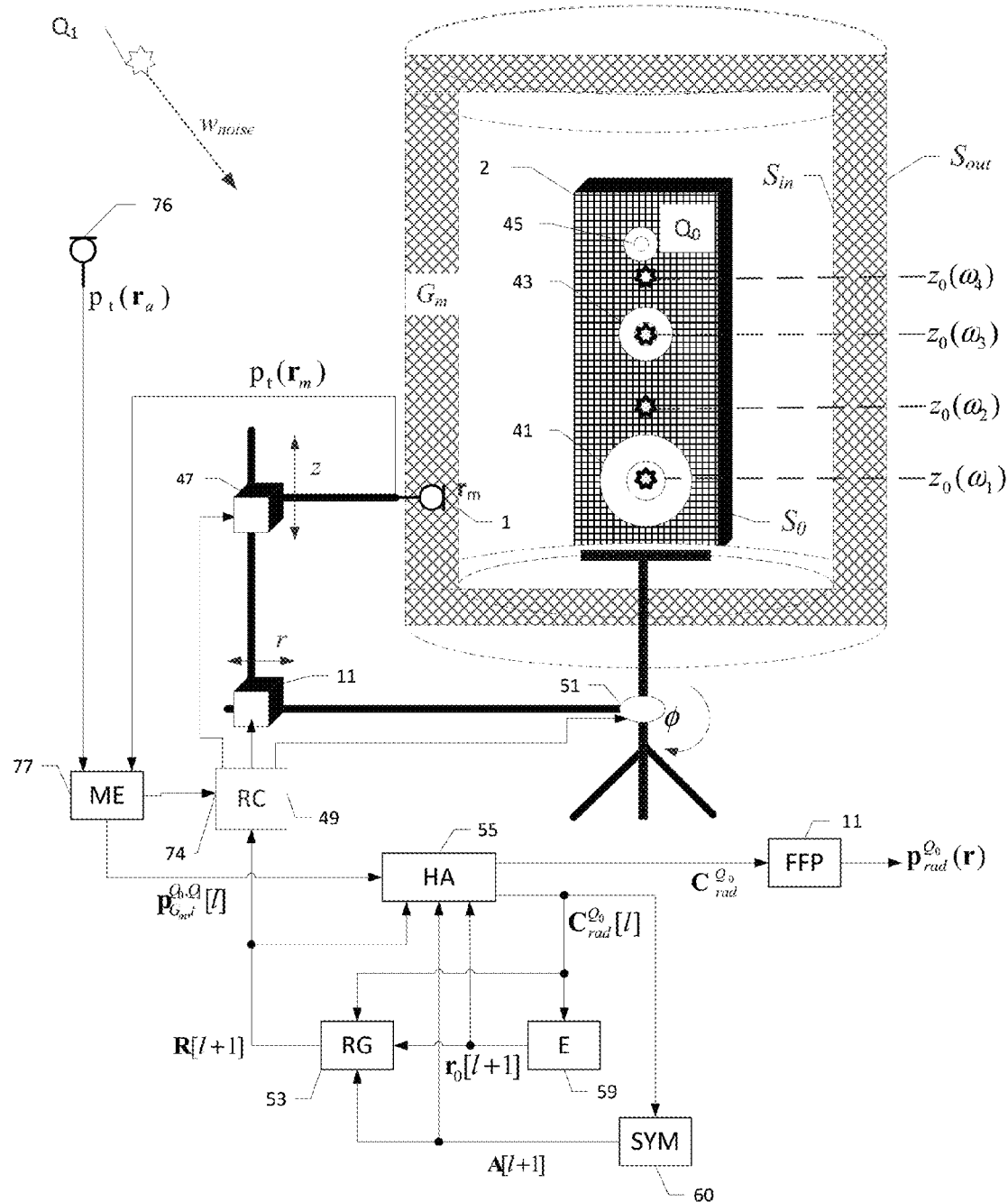
FIG. 7 shows an embodiment of the measurement system determining the optimal expansion point.

FIG. 7 shows an embodiment of the measurement system applied to a multi-way loudspeaker system 2, comprising a woofer 41, midrange transducer 43 and a tweeter 45. The inner and outer surfaces $S_{in}$ and $S_{out}$, respectively, of the scanning range $G_m$ are cylinders to fit the slim shape of the loudspeaker. The sensor 1 is placed at the measurement point $r_m$ by a positioning device 49 using three actuators 11, 47, 51 in cylindrical coordinates r, z and $\phi$. A second sensor 76 is placed outside the scanning range $G_m$ at a larger distance from the source under test $Q_0$ than the sensor 1 to monitor an ambient sound signal $p_t(r_a)$ representing acoustical disturbances $w_{noise}$ generated by a noise source $Q_1$. An noise identifier 77 compares the scanning signal $p_t(r_m)$ with the ambient sound signal $p_t(r_a)$ and detects an invalid measurement corrupted by the noise source $Q_1$. After storing the valid parts of the scanning signal $p_t(r_m)$ in the scanned data set $p_{G_m,t}^{Q_0,Q_1}$ the noise identifier 77 repeats the measurement at the current sensor position $r_m$ until the collected valid parts are complete.

The analyzer 55 is embedded in an iterative process beginning with the determination of wave coefficients $C_{rad}^{Q_0}$[1] based on the preliminary scanned data set $p_{G_m,t}^{Q_0,Q_1}$[1] in the first step l=1. An expansion point identifier 59 detects the acoustical center $z_0(\omega)$ of the device under test 2 as a function of frequency $\omega$ and determines the coordinates of an expansion point $r_0$[l+1]. A symmetry identifier 60 generating symmetry parameters A[l+1] representing the axial and reflection symmetry of the sound field and the orientation of the device under test 2 associated with the direction of main radiation. Based on the identified expansion point $r_0$[l+1] and symmetry parameters A[l+1] in wave coefficients $C_{rad}^{Q_0}$[l] a generator 53 extends the scanning vector R[l+1] by introducing additional measurement points placed at optimal positions in the scanning range $G_m$. Based on the extended scanning vector R[l+1] the positioning device 49 performs an adaptive scanning process considering the identified properties of the device under test 2. Thus the scanned data set $p_{G_m,t}^{Q_0,Q_1}$[l] provides sufficient information for the wave expansion while using a minimum number of measurement points.

Figure 8:
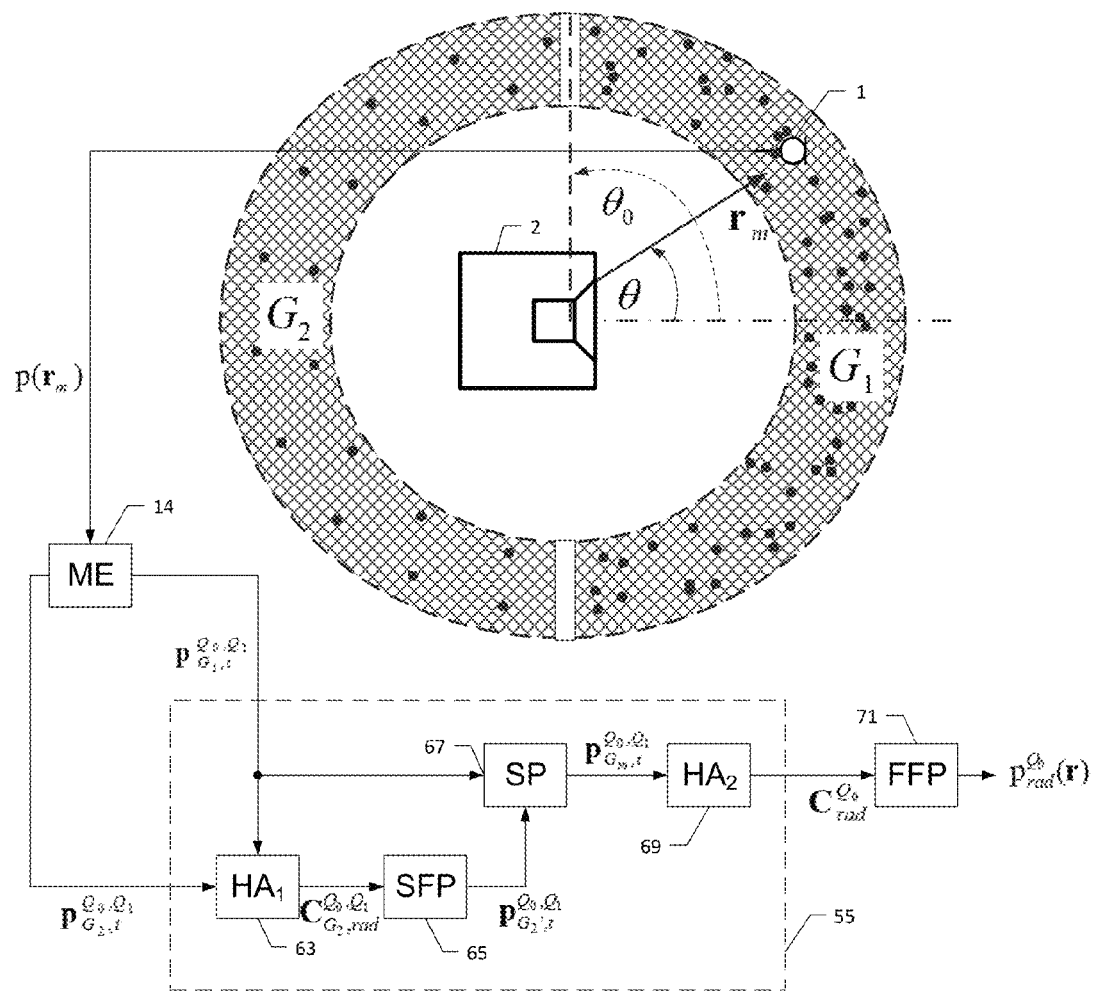
FIG. 8 shows an embodiment of the measurement system using two scanning ranges $G_1$ and $G_2$ with density of the measurement points.

FIG. 8 shows an embodiment of the analyzer 55 using two scanning ranges $G_1$ and $G_2$, having a different density of measurement points. The acquisition device 14 collects the measured sensor output $p_t(r_m)$ in the first scanned data set $p_{G_m,t}^{Q_0,Q_1}$ and in the scanned data set $p_{G_2,t}^{Q_0,Q_1}$. The first sub-analyzer 63 generates a second wave coefficients $C_{G_2,rad}^{Q_0,Q_1}$ according to Eq. (15) based on second scanned data set $p_{G_2,t}^{Q_0,Q_1}$, wherein the number of measurement points $M_2$ in the second scanning range $G_2$ limits the maximal order $N_2$ of the second wave coefficients $C_{G_2,rad}^{Q_0,Q_1}$. An interpolator (65) generates an interpolated scanned data set $p_{G_2,t}^{Q_0,Q_1}$ by extrapolation in accordance with Eq. (35) based on the second wave coefficients $C_{G_2,rad}^{Q_0,Q_1}$. The number $M_{2S}$ of elements in the interpolated scanned data set $p_{G_2,t}^{Q_0,Q_1}$ is higher than the number of measurement points $M_2$ in the second scanning range $G_2$. A combiner 67 generates a unified data set $p_{G_m,t}^{Q_0,Q_1}$ merging the first scanned data set $p_{G_2,t}^{Q_0,Q_1}$ and the interpolated scanned data set $p_{G_2,t}^{Q_0,Q_1}$ wherein the density of samples in the second scanning range $G_2$ equals the density of measurement points in first scanning range $G_1$. A second analyzer 69 generates the wave coefficients $C_{red}^{Q_0}$ of the direct sound according to Eq. (15) based on the unified data set $p_{G_m,t}^{Q_0,Q_1}$ wherein the order $N_{rad}$ of the expansion is larger than the order $N_2$ of the second wave coefficients $C_{G_2,rad}^{Q_0,Q_1}$. However, the interpolation cannot increase the resolution of the identified directivity pattern in the second scanning range $G_2$.

Figure 9:
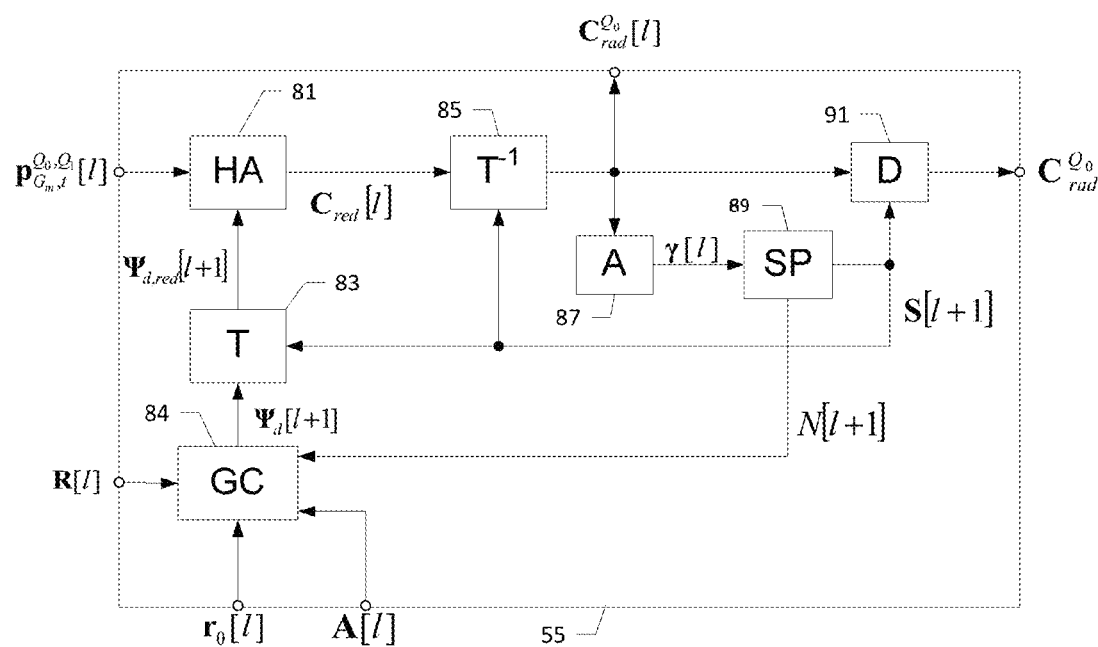
FIG. 9 shows an embodiment of the analyzer using selected expansion functions.

FIG. 9 shows an alternative embodiment of the analyzer 55 for getting a maximum resolution of the directivity pattern based on a minimum number M of measurement points. An estimator 81 generates a reduced wave coefficients $C_{red}^{Q_0}$[l] according to Eq. (15) by using expansion matrix $\Psi_{d,red}$[l] determined in the 1$^{st}$-step.

Based on the reduced wave coefficients $C_{red}^{Q_0}$[l] an inverse transformer 85 generates iterative wave coefficients $$C_{rad}^{Q_0}[l+1]=S[l+1]^T C_{red}[l+1] \qquad (47)$$

by using a predefined selection matrix S[l], wherein the number of elements in said iterative wave coefficients $C_{rad}^{Q_0}$[l] is larger than the number of elements in said reduced wave coefficients $C_{red}^{Q_0}$[l].

Based on iterative the wave coefficients $C_{rad}^{Q_0}$[l] an evaluator 87 generates a contribution vector $\gamma$[l] comprising the contribution ratio $\gamma_j$[l] in accordance with Eq. (22). A selector 89 generates the selection matrix S[l] by using the contribution vector $\gamma$[l] and generates a maximal order N[l+1] of the coefficients associated with the expansion function, wherein coefficients $c_{j,rad}$ are set to zero, if its contribution $\gamma_j$[l]) is below a critical threshold $\gamma_0$.

A generator 84 generates a complete expansion matrix $\Psi_d[l+1]$ by considering
- maximal order $N[l+1]$ of the expansion function and/or
- number and position $R[l]$ of the measurement points $(r_m)$ in said scanning range $(G_m)$ and/or
- an expansion point $r_0[l]$ representing the position of the acoustical center of the source under test $Q_0$ and/or
- orientation information $A[l]$ representing main direction of radiation of the source under test $Q_0$ and/or
- rotational and/or reflection symmetry $A[l]$ of the sound field generated by the source under test $Q_0$.

Based on the complete expansion matrix $\Psi_d[l+1]$ and the selection matrix $S[l+1]$ a transformer 83 generates an updated value of the reduced expansion matrix $$\Psi_{d,red}[l+1]=S[l+1]\Psi_d[l+1] \tag{48}$$

wherein the number of elements in the reduced expansion matrix $\Psi_{d,red}[l+1]$ is smaller than the number of elements in the complete expansion matrix $\Psi_d[l+1]$. The reduced expansion matrix $\Psi_{d,red}[l+1]$ is the basis for a sparse wave expansion comprising a reduced number of coefficients in $C_{red}^{Q_0}$, which can be estimated by limited number of measurement points.

Based on iterative wave coefficients $C_{rad}^{Q_0}[l]$ a controller 91 generates a direct wave coefficients $C_{rad}^{Q_0}$, if the difference between the values of iterative wave coefficients $C_{red}^{Q_0}[l+1]-C_{rad}^{Q_0}[l]$ at two iterative steps of the iteration is below a predefined threshold.

Advantages of the Invention

The invention measures the direct sound radiated by a device under test $Q_0$ in a non-anechoic acoustical environment under the influence of ambient noise. Dispensing with an anechoic room reduces the cost and gives more flexibility in the development of loudspeakers and other acoustical devices. The new measurement techniques provide a comprehensive data set $C_{rad}^{Q_0}$ describing the radiated sound field at any point outside the scanning range $G_m$. The near-field information are important for assessing mobile phone, laptops and other personal audio devices. Further benefits are the simplicity, robustness and increased speed of the measurement compared to techniques known in prior art. The new PSFS-method dispenses with a time-consuming perturbation and requires no information about the shape and acoustical properties of the surface of the device under test $Q_0$. The measurement technique exploits redundant information provided in the scanned data set and describes the consistency and accuracy of the measurement results at any observation point by a relative error measure. The invention performs the field separation and wave expansion by using a minimum number of measurement points associated with a short measurement time.

In the foregoing specification, the invention has been described with reference to specific examples of embodiments of the invention. It will, however, be evident that various modifications and changes may be made therein without departing from the broader spirit and scope of the invention as set forth in the appended claims. For example, the connections may be a type of connection suitable to transfer signals from or to the respective nodes, units or devices, for example via intermediate devices. Accordingly, unless implied or stated otherwise the connections may for example be direct connections or indirect connections.

Because the apparatus implementing the present invention is, for the most part, composed of electronic components and circuits known to those skilled in the art, details of the circuitry and its components will not be explained in any greater extent than that considered necessary as illustrated above, for the understanding and appreciation of the underlying concepts of the present invention and in order not to obfuscate or distract from the teachings of the present invention.

Some of the above embodiments, as applicable, may be implemented using a variety of different circuitry components. For example, the exemplary topology in the figures and the discussion thereof is presented merely to provide a useful reference in discussing various aspects of the invention. Of course, the description of the topology has been simplified for purposes of discussion, and it is just one of many different types of appropriate topologies that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

Also, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device. Devices functionally forming separate devices may be integrated in a single physical device.

In the claims, any reference signs placed between parentheses shall not be construed as limiting the claim. The word "comprising" does not exclude the presence of other elements or steps then those listed in a claim. Furthermore, the terms "a" or "an", as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage. The order of method steps as presented in a claim does not prejudice the order in which the steps may actually be carried, unless specifically recited in the claim.

Skilled artisans will appreciate that elements in the figures are illustrated for simplicity and clarity and have not necessarily drawn to scale. For example, the chosen elements are only used to help to improve the understanding of the functionality and the arrangements of these elements in various embodiments of the present invention. Also, common but well understood elements that are useful or necessary in a commercial feasible embodiment are mostly not depicted in order to facilitate a less abstracted view of these various embodiments of the present invention. It will further be appreciated that certain actions and/or steps in the described method may be described or depicted in a particular order of occurrences while those skilled in the art will understand that such specificity with respect to sequence is not actually required. It will also be understood that the terms and expressions used in the present specification have the ordinary meaning as it accorded to such terms and expressions with respect to their corresponding respective areas of inquiry and study except where specific meanings have otherwise be set forth herein.

The invention claimed is:

1. An arrangement for determining direct sound radiated by a sound source under test comprising:
   an acquisition device, generating a scanned data set by measuring a state variable of a sound field surrounding the sound source under test at a plurality of measurement points wherein the measurement points are arranged in a scanning range and the scanned data set describes the superposition of the direct sound with at least one of the following other sound components:
   an incoming sound generated by the direct sound reflected on an external boundary,
   a secondary sound generated by interaction of said incoming sound with the surface of the sound source under test;
   an identifier, based on the scanned data set generating parameter information, which comprise filtered wave coefficients associated with the expansion of the scanned data set in the scanning range by considering the time delay of the sound components in the scanned data set, wherein the early arriving direct sound is preserved and the later arriving sound components are attenuated;
   an analyzer, based on the scanned data set generating direct wave coefficients associated with the expansion of the direct sound, said analyzer contains the following elements:
   a field separation module, based on the scanned data set generating separated direct wave coefficients, which represents the direct sound for frequencies below a defined cut-off frequency;
   an evaluator, based on assessment information provided by the field separation module or the identifier generating a crossover frequency corresponding to said cut-off frequency;
   a crossover, which assigns the separated direct wave coefficients to the direct wave coefficients for signal frequencies below said crossover frequency and assigns the filtered wave coefficients to the direct wave coefficients for signal frequencies which are higher or equal to said crossover frequency;
   and an extrapolator, based on direct wave coefficients generating a predicted state variable describing the radiated direct sound at a defined observation point outside the inner boundary of the scanning range.

2. The arrangement according to claim 1, wherein:
   said parameter information describes a transfer function between the incoming sound and the secondary sound;
   said identifier contains:
   a filter, based on said scanned data set generating a filtered scanned data set, wherein a reverberant sound part in the scanned data set is preserved and a direct sound part in the scanned data set is attenuated;
   an IO-field separation module, based on the filtered scanned data set generating late incoming wave coefficients associated with the expansion of the reverberant part of the incoming sound and generating late outgoing wave coefficients associated with the expansion of the late parts of the secondary sound when the direct sound is decayed;
   and said analyzer contains:
   an IO-field separation module, based on scanned data set generating total incoming wave coefficients associated with the expansion of the total incoming sound, and generating total outgoing wave coefficients associated with the expansion of total outgoing sound comprising the secondary sound and direct sound; and
   a PS-field separation module, based on the total incoming wave coefficients and the total outgoing wave coefficients and the late incoming wave coefficients and the late outgoing wave coefficients generating primary wave coefficients associated with the expansion of the direct sound radiated from the sound source under test.

3. The arrangement according to claim 2, wherein said PS-field separation module comprises:
   a comparator, based on both the late incoming wave coefficients and the late outgoing wave coefficients generating a transparency parameter, which describes the acoustical transparency of the space enclosed by the scanning range;
   a synthesizer, based on the total incoming wave coefficients and the transparency parameter generating secondary wave coefficients associated with the expansion of the secondary sound radiated from the sound source under test; and
   a combiner, based on total outgoing wave coefficients and the secondary wave coefficients generating said direct wave coefficients.

4. The arrangement according to claim 2, wherein said PS-field separation module comprises:
   a correlator, based on both the total incoming wave coefficients and the late incoming wave coefficients generating a transmission parameter, which describes the concurrence of the directivity of the total incoming sound and the directivity of the reverberant part of the incoming sound;
   a synthesizer, based on both the total incoming wave coefficients and the transmission parameter generating secondary wave coefficients associated with the expansion of the secondary sound radiated from the sound source under test; and
   a combiner, based on total outgoing wave coefficients and the secondary wave coefficients generating said direct wave coefficients.

5. The arrangement according to claim 1, wherein
   said identifier contains:
   a filter, based on the scanned data set generating a filtered scanned data set, wherein said filter attenuates signal components having a time delay larger than a pre-defined value; and
   a free-field expander, based on the filtered scanned data set generating said filtered wave coefficients and generating said assessment information; wherein said assessment information describes the amplitude of the incoming sound.

6. The arrangement according to claim 1, wherein:

said analyzer receives field information describing the properties of the sound field generated by the source under test;

said identifier, based on the direct wave coefficients or scanned data set generating said field information comprising at least one of:

an expansion point associated with the position of the acoustical center of the source under test, orientation information associated with the main radiation direction of the source under test, rotational symmetry information of the sound field generated by the source under test, and reflection symmetry information of the sound field generated by the source under test.

7. The arrangement according to claim 6, wherein said acquisition device contains one of:

at least one a scanning sensor, each measuring the state variable of the sound field at the current position of the scanning sensor;

a scanning generator, based on the field information generating a scanning vector, wherein the scanning vector comprising the position of at least one additional measurement point which gives unique information about the direct sound generated by the source under test; and a positioning device, which moves the scanning sensor to the additional measurement point defined by the scanning vector.

8. The arrangement according to 6, wherein said analyzer contains at least one of:

a generator, based on the field information generating an expansion matrix; wherein the expansion matrix uses a coordinate system which is aligned with position and orientation of the source under test or the symmetry of the sound field; and an estimator based on the scanned data set generating said direct wave coefficients by using said expansion matrix comprising expansion functions associated with solution of the wave equation.

9. The arrangement according to claim 1, wherein:

said acquisition device, measuring a state variable of a sound field surrounding said source under test at a plurality of measurement points separated in two non-overlapping scanning ranges;

the first scanning range generating a first scanned data set has a higher density of measurement points than the second scanning range generating the second scanned data set; and said analyzer, based on the first scanned data set and on the second scanned data set generating direct wave coefficients associated with the expansion of the direct sound.

10. The arrangement according to claim 9, wherein said analyzer comprises:

a first sub-analyzer, based on second scanned data set generating second wave coefficients, wherein the number of measurement points in the second scanning range limits the maximal order of the second wave coefficients;

an interpolator, based on the second wave coefficients generating an interpolated scanned data set, comprising a number of elements, which is higher than the number of measurement points in the second scanning range;

a combiner, based on both the first scanned data set and the interpolated scanned data set generating a unified data set;

a second sub-analyzer, based on the unified data set generating said direct wave coefficients, which provides at least one wave coefficient at a maximal order which is higher than the maximal order of the second wave coefficients.

11. An arrangement according to claim 1, wherein:

said direct wave coefficients contain at least one coefficient having a maximal order, wherein at least one coefficient in said direct wave coefficients is approximated by zero, wherein said coefficient has an order which is smaller than said maximal order, or the number of measurement points in the scanned data set is smaller than the maximal number of coefficients in said direct wave coefficients.

12. The arrangement according to claim 11, wherein said analyzer comprises at least one of:

an estimator, based on the scanned data set generating reduced wave coefficients by using a reduced expansion matrix;

an inverse transformer, based on the reduced wave coefficients generating iterative wave coefficients by using a predefined selection matrix, wherein the number of elements in said iterative wave coefficients is larger than the number of elements in said reduced wave coefficients;

an evaluator, based on iterative wave coefficients generating a contribution vector, which describes the contribution of an element of the iterative wave coefficients to the total sound power radiated by source under test;

a selector, based on the contribution vector generating said predefined selection matrix and generating a maximal order of the expansion function; wherein at least one element is set to zero, if its contribution is below a critical threshold;

a generator, generating a complete expansion matrix by using at least one of:

maximal order of the expansion function, number and position of the measurement points in said scanning range, an expansion point representing the position of the acoustical center of the source under test, orientation information representing main direction of radiation of the source under test, rotational symmetry of the sound field generated by the source under test, and reflection symmetry of the sound field generated by the source under test;

a transformer, based on the complete expansion matrix generating an updated value of said reduced expansion matrix, wherein the number of elements in the reduced expansion matrix is smaller than the number of elements in the complete expansion matrix; and a controller, based on iterative wave coefficients generating said direct wave coefficients, if the change of the iterative wave coefficients between two iterative steps of the iteration is below a predefined threshold.

13. An arrangement according to claim 1, wherein:

said acquisition device contains:

at least one scanning sensor, generating a scanning output representing the measured state variable of the sound field at a current position of the scanning sensor;

a positioning device, which moves the scanning sensor to at least one measurement point located in a scanning range;

an ambient noise sensor, generating an ambient noise output representing a state variable of the sound field at an ambient position outside the scanning range, wherein the distance between ambient noise sensor and the sound source under test is larger than the distance between the scanning sensor and the sound source under test; and said arrangement contains a noise identifier, based on the scanning output and the ambient noise output generating valid scanned data set, wherein said noise identifier detects an invalid part in the scanning output corrupted by said ambient noise source by analyzing the ambient noise output and excludes the detected invalid part from the scanned data set.

14. The arrangement according to claim 13, wherein:

said noise identifier repeats the measurement of the state variable of the sound field at the measurement point if the scanning output contains invalid parts corrupted by said ambient noise source, or said noise identifier contains a storage device, which stores the valid parts of the scanning output of multiple measurements and generates a merged output assigned to the scanned data set containing valid and complete information at the measurement point.

15. The arrangement according to claim 1, wherein:

said analyzer, based on the scanned data set generating direct wave coefficients associated with the expansion of the direct sound or generating sound error coefficients representing the error in the expansion of the scanned data set; and said extrapolator, based on the sound error coefficients generating information describing the error of the predicted quantity at the observation point.

16. A method for determining direct sound radiated by a sound source under test comprising:

measuring a state variable of a sound field surrounding the sound source under test, wherein said state variable describes the superposition of the direct sound with at least one of the following other sound components:

an incoming sound generated by an ambient noise source or by the direct sound reflected on an external boundary, and a secondary sound generated by an interaction of said incoming sound with the surface of the sound source under test;

generating a scanned data set by collecting the state variable at a plurality of measurement points arranged in a scanning range;

a filtered scanned data set by filtering the scanned data set, wherein said filtering preserves the direct sound and attenuates the other sound components which have a larger time delay than the direct sound;

identifying parameter information based on the scanned data set wherein said parameter information comprises filtered wave coefficients associated with an expansion of the filtered scanned data set by using expansion function which are solutions of the wave equation, wherein the filtered wave coefficients is a valid representation of the direct sound for signal frequencies above a defined cut-off frequency;

performing an expansion of the scanned data set for signal frequencies below the cut-off frequency by using separate expansion functions representing incoming sound and outgoing sound;

generating separated direct wave coefficients associated with the expansion of the outgoing sound, wherein the separated direct wave coefficients is a valid representation of the direct sound for signal frequencies below said cut-off frequency;

generating a crossover frequency corresponding to said cut-off frequency based on assessment and parameter information;

generating direct wave coefficients associated with the expansion of the direct sound by:

assigning the separated direct wave coefficients to the direct wave coefficients for signal frequencies below said crossover frequency, assigning the filtered wave coefficients to the direct wave coefficients for signal frequencies which are higher or equal to said crossover frequency, and and based on direct wave coefficients generating a predicted state variable describing the radiated direct sound field at a defined observation point outside the inner boundary of the scanning range.

17. The method according to claim 16, wherein the parameter information contains a transfer function between an incoming sound and a secondary sound;

wherein identifying parameter information contains at least one of:

generating a filtered scanned data set by filtering said scanned data set, wherein the reverberant sound part is preserved and the direct sound part is attenuated;

generating late incoming wave coefficients based on the filtered scanned data set, wherein said late incoming wave coefficients represent the reverberant part of the incoming sound;

generating late outgoing wave coefficients based on the filtered scanned data set, wherein the late outgoing wave coefficients represent the late parts of the secondary sound when the direct sound is decayed;

generating total incoming wave coefficients based on scanned data set, wherein said total incoming wave coefficients represent the total incoming sound;

generating total outgoing wave coefficients based on scanned data set, wherein said total outgoing wave coefficients represent the total outgoing sound comprising the secondary sound and direct sound; and generating primary wave coefficients based on the total incoming wave coefficients and the total outgoing wave coefficients and the late incoming wave coefficients and the late outgoing wave coefficients; wherein said primary wave coefficients represents the direct sound radiated from the sound source under test.

18. The method according to claim 17, wherein identifying parameter information further contains at least one of:

generating a transparency parameter based on both the late incoming wave coefficients and the late outgoing wave coefficients, wherein the transparency parameter describes the acoustical transparency of the space enclosed by the scanning range;

generating secondary wave coefficients based on the total incoming wave coefficients and the transparency parameter, wherein the secondary wave coefficients represents the secondary sound radiated from the sound source under test; and generating said direct wave coefficients based on the total outgoing wave coefficients and the secondary wave coefficients.

19. The method according to claim 17, wherein identifying parameter information further contains at least one of:

generating a transmission parameter by correlating the total incoming wave coefficients and the late incoming wave coefficients, wherein the transmission parameter describes the concurrence of the directivity of the total incoming sound and the directivity of the reverberant part of the incoming sound;

synthesizing secondary wave coefficients based on both the total incoming wave coefficients and the transmission parameter, wherein the secondary wave coefficients represent the secondary sound radiated from the sound source under test; and generating said direct wave coefficients based on the total outgoing wave coefficients and the secondary wave coefficients.

20. The method according to claim 16, wherein generating a crossover frequency comprises:

generating a first error by assessing the mismatch between the scanned data set and an expanded data set based on said separated direct wave coefficients associated with said expansion functions;

performing an expansion of the filtered scanned data set by using separate expansion functions for incoming filtered sound and outgoing filtered sound;

generating a second error of the filtered wave coefficients by comparing the energy of the incoming filtered sound and the outgoing filtered sound;

summarizing the first error and the second error to a total error;

generating an optimal value of said cut-off frequency, which gives a minimum total error; and adjusting the crossover frequency to the cut-off frequency.

21. A method according to claim 16, further comprising:

generating direct wave coefficients by using field information describing the properties of the sound field generated by the source under test, wherein direct wave coefficients are associated with the expansion of the direct sound; and based on the direct wave coefficients or the scanned data set generating said field information comprising at least one of:

an expansion point associated with the position of the acoustical center of the source under test, orientation information associated with the main radiation direction of the source under test, rotational symmetry information of the sound field generated by the source under test, and reflection symmetry information of the sound field generated by the source under test.

22. The method according to claim 21, wherein said generating the scanned data set comprises at least one of:

measuring the state variable of the sound field at the current position of the scanning sensor;

generating a scanning vector based on the field information; wherein the scanning vector comprises the position of an additional measurement point which gives unique information about direct sound generated by the source under test;

moving the scanning sensor to the additional measurement point defined by the scanning vector; and measuring a state variable of the sound field at the additional measurement point.

23. The method according to claim 21, wherein generating direct wave coefficients comprises based on the field information generating an expansion matrix;

wherein the expansion matrix contains a minimum of elements by using a coordinate system in the expansion which is aligned with the position and the orientation of the source under test or the symmetry of the sound field; and based on the scanned data set generating said direct wave coefficients by using said expansion matrix.

24. The method according to claim 16, wherein measuring a state variable of the sound field surrounding said source under test at a plurality of measurement points separated in two non-overlapping scanning ranges;

wherein a first scanning range has a higher density of measurement points than a second scanning range; and further comprising:

generating a first scanned data set which represents the first scanning range;

generating a second scanned data set which represents the second scanning range; and based on the first scanned data set and on the second scanned data set generating direct wave coefficients associated with the expansion of the direct sound.

25. The method according to claim 24, wherein generating direct wave coefficients comprises:

based on the second scanned data set generating second wave coefficients, wherein the number of measurement points in the second scanning range limits the maximal order of the coefficients in the second wave coefficients;

based on the second wave coefficients generating an interpolated scanned data set; wherein the interpolated scanned data set comprises a number of elements, which is higher than number of measurement points in the second scanning range;

based on both the first scanned data set and the interpolated scanned data set generating a unified data set; and based on the unified data set generating said direct wave coefficients; wherein the direct wave coefficients contain at least one coefficient having a maximal order which is higher than the maximal order in the second wave coefficients.

26. The method according to claim 16, wherein:

said direct wave coefficients have a maximal order;

at least one coefficient in said direct wave coefficients is approximated by zero;

said coefficient has an order which is smaller than said maximal order; or the number of measurement points in the scanned data set is smaller than the maximal number of coefficients in said direct wave coefficients.

27. The method according to claim 26, wherein said generating direct wave coefficients comprises at least one of:

based on the scanned data set generating reduced wave coefficients by using a reduced expansion matrix;

based on the reduced wave coefficients generating iterative wave coefficients by using a predefined selection matrix, wherein the number of elements in said iterative wave coefficients is larger than the number of elements in said reduced wave coefficients;

based on iterative wave coefficients generating a contribution vector, which describes the contribution of a coefficient to the total sound power radiated by source under test;

based on the contribution vector generating said selection matrix; wherein selection matrix set the coefficients to zero, if its contribution is below a critical threshold;

based on the contribution vector generating a maximal order of the coefficients associated with the expansion;

generating a complete expansion matrix by using at least one of:

maximal order of the expansion, number and position of the measurement points in said scanning range, an expansion point representing the position of the acoustical center of the source under test, orientation information representing main direction of radiation of the source under test, rotational symmetry information of the sound field generated by the source under test, and reflection symmetry information of the sound field generated by the source under test;

based on the complete expansion matrix generating an updated value of said reduced expansion matrix, wherein the number of elements in the reduced expansion matrix is smaller than the number of elements in the complete expansion matrix;

based on iterative wave coefficients generating said direct wave coefficients, if the difference between the values of iterative wave coefficients at two iterative steps of the iteration is below a pre-defined threshold; and based on direct wave coefficients generating a predicted state variable describing the radiated direct sound field at a defined observation point outside the inner boundary of the scanning range.

28. The method according to claim 16, wherein generating a scanned data set comprises:

moving a scanning sensor to at least one measurement point located in a scanning range;

generating a scanning output representing the measured state variable of the sound field at the current position of a scanning sensor;

generating an ambient noise output representing a state variable of the sound field at an ambient position outside the scanning range, wherein the distance between ambient noise sensor and the sound source under test is larger than the distance between the scanning sensor and the sound source under test;

analyzing the ambient noise output and the scanning output;

separating an invalid part of in the scanning output corrupted by said ambient noise source from valid parts; and collecting the valid parts of the scanning output in a scanned data set.

29. The method according to claim 28, wherein said collecting the scanning output comprises:

repeating the measurement of the state variable of the sound field at the measurement point if the scanning output contains at least one invalid part corrupted by said ambient noise source;

storing the valid parts of the scanning output;

generating a merged output by merging the valid parts of multiple measurements; and assigning the merged output to the scanned data set, if the merged output contains valid and complete information at the measurement point.

30. The method according to claim 16, further comprising:

generating sound error coefficients representing the error in the expansion of the scanned data set;

based on direct wave coefficients generating a predicted state variable describing the radiated direct sound field at a defined observation point outside the inner boundary of the scanning range; and based on the sound error coefficients generating information describing the error of the predicted quantity at the observation point.

* * * * *